(12) United States Patent
Zhou et al.

(10) Patent No.: US 10,478,778 B2
(45) Date of Patent: Nov. 19, 2019

(54) COMPOSITE MEMBRANES WITH IMPROVED PERFORMANCE AND/OR DURABILITY AND METHODS OF USE

(71) Applicant: 3M INNOVATIVE PROPERTIES COMPANY, St. Paul, MN (US)

(72) Inventors: Jinsheng Zhou, Woodbury, MN (US); Ryan C. Shirk, Mendota Heights, MN (US); David Scott Seitz, Woodbury, MN (US); Moses M. David, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/737,945

(22) PCT Filed: Jul. 1, 2016

(86) PCT No.: PCT/US2016/040653
§ 371 (c)(1),
(2) Date: Dec. 19, 2017

(87) PCT Pub. No.: WO2017/004495
PCT Pub. Date: Jan. 5, 2017

(65) Prior Publication Data
US 2018/0154311 A1    Jun. 7, 2018

Related U.S. Application Data

(60) Provisional application No. 62/187,505, filed on Jul. 1, 2015.

(51) Int. Cl.
*B01D 61/36* (2006.01)
*B01D 67/00* (2006.01)
(Continued)

(52) U.S. Cl.
CPC ....... *B01D 61/362* (2013.01); *B01D 67/0006* (2013.01); *B01D 67/0088* (2013.01);
(Continued)

(58) Field of Classification Search
CPC .............. B01D 61/362; B01D 69/12; B01D 2325/022; B01D 61/36; B01D 61/366
See application file for complete search history.

(56) References Cited

U.S. PATENT DOCUMENTS 2,930,754 A    3/1960    Stuckey
2,958,656 A    11/1960   Stuckey
(Continued)

FOREIGN PATENT DOCUMENTS

CA    2020696    2/1991
CA    2000281    4/1991
(Continued)

OTHER PUBLICATIONS

Billard, "Diffusion of Organic Compounds Through Chemically Asymmetric Membranes Made of Semi-Interpenetrating Polymer Networks", Separation and Purification Technology, 1998, vol. 14, pp. 221-232.
(Continued)

*Primary Examiner* — Ana M Fortuna
(74) *Attorney, Agent, or Firm* — Katherine M. Scholz; Harold C. Knecht, III

(57) ABSTRACT

A composite membrane for selectively separating (e.g., pervaporating) a first fluid (e.g., first liquid such as a high octane compound) from a mixture comprising the first fluid (e.g., first liquid such as a high octane compound) and a second fluid (e.g., second liquid such as gasoline). The composite membrane includes a porous substrate comprising opposite first and second major surfaces, and a plurality of pores. A pore-filling polymer is disposed in at least some of the pores so as to form a layer having a thickness within the porous substrate. The composite membrane further includes at least one of: (a) an ionic liquid mixed with the pore-filling polymer; or (b) an amorphous fluorochemical film disposed on the composite membrane.

5 Claims, 11 Drawing Sheets

(51) Int. Cl.
  *B01D 69/10* (2006.01)
  *B01D 69/12* (2006.01)
  *B01D 71/40* (2006.01)
  *B01D 71/48* (2006.01)
  *B01D 71/52* (2006.01)
  *B01D 71/70* (2006.01)
  *F02D 19/06* (2006.01)

(52) U.S. Cl.
  CPC ......... *B01D 67/0093* (2013.01); *B01D 69/10* (2013.01); *B01D 69/12* (2013.01); *B01D 69/125* (2013.01); *B01D 71/40* (2013.01); *B01D 71/48* (2013.01); *B01D 71/52* (2013.01); *B01D 71/70* (2013.01); *B01D 2323/286* (2013.01); *B01D 2323/30* (2013.01); *B01D 2323/345* (2013.01); *B01D 2323/40* (2013.01); *B01D 2323/46* (2013.01); *F02D 19/0671* (2013.01); *Y02T 10/36* (2013.01)

(56) References Cited

U.S. PATENT DOCUMENTS

| | | | |
|---|---|---|---|
| 3,370,102 A | 2/1968 | Carpenter | |
| 4,031,864 A | 6/1977 | Crothers | |
| 4,115,465 A | 9/1978 | Elfert | |
| 4,277,344 A | 7/1981 | Cadotte | |
| 4,366,307 A | 12/1982 | Singh | |
| 4,464,494 A | 8/1984 | King | |
| 4,581,043 A | 4/1986 | Scheer | |
| 4,582,726 A | 4/1986 | Shuey | |
| 4,778,851 A | 10/1988 | Henton | |
| 4,789,480 A | 12/1988 | Bruschke | |
| 4,798,764 A | 1/1989 | Tressler | |
| 4,802,987 A | 2/1989 | Black | |
| 4,828,773 A | 5/1989 | Feimer | |
| 4,846,977 A | 7/1989 | DeVellis | |
| 4,861,628 A | 8/1989 | Schucker | |
| 4,879,044 A | 11/1989 | Feimer | |
| 4,885,096 A | 12/1989 | Black | |
| 4,914,064 A | 4/1990 | Schucker | |
| 4,929,357 A | 5/1990 | Schucker | |
| 4,929,358 A | 5/1990 | Koenitzer | |
| 4,944,880 A | 7/1990 | Ho | |
| 4,946,594 A | 8/1990 | Thaler | |
| 4,962,271 A | 10/1990 | Black | |
| 4,968,430 A | 11/1990 | Hildenbrand | |
| 4,976,868 A | 12/1990 | Sartori | |
| 4,990,275 A | 2/1991 | Ho | |
| 4,997,906 A | 3/1991 | Thaler | |
| 5,012,035 A | 4/1991 | Sartori | |
| 5,012,036 A | 4/1991 | Sartori | |
| 5,019,666 A | 5/1991 | Sartori | |
| 5,028,685 A | 7/1991 | Ho | |
| 5,030,355 A | 7/1991 | Schucker | |
| 5,039,417 A | 8/1991 | Schucker | |
| 5,039,418 A | 8/1991 | Schucker | |
| 5,039,422 A | 8/1991 | Schucker | |
| 5,045,354 A | 9/1991 | Feimer | |
| 5,049,281 A | 9/1991 | Schucker | |
| 5,055,631 A | 10/1991 | Sartori | |
| 5,055,632 A | 10/1991 | Schucker | |
| 5,063,186 A | 11/1991 | Schucker | |
| 5,069,793 A | 12/1991 | Kaschemekat | |
| 5,075,006 A | 12/1991 | Schucker | |
| 5,093,003 A | 3/1992 | Ho | |
| 5,095,171 A | 3/1992 | Feimer | |
| 5,096,592 A | 3/1992 | Schucker | |
| 5,098,570 A | 3/1992 | Schucker | |
| 5,108,549 A | 4/1992 | Wenzlaff | |
| 5,128,439 A | 7/1992 | Sartori | |
| 5,130,017 A | 7/1992 | Schucker | |
| 5,138,023 A | 8/1992 | Sartori | |
| 5,159,130 A | 10/1992 | Satori | |
| 5,180,496 A | 1/1993 | Sartori | |
| 5,221,481 A | 6/1993 | Schucker | |
| 5,241,039 A | 8/1993 | Ho | |
| 5,254,795 A | 10/1993 | Boucher | |
| 5,256,503 A | 10/1993 | Cook | |
| 5,275,726 A | 1/1994 | Feimer | |
| 5,290,452 A | 3/1994 | Schucker | |
| 5,350,519 A | 9/1994 | Kaschemekat | |
| 5,396,019 A | 3/1995 | Sartori | |
| 5,425,865 A | 6/1995 | Singleton | |
| 5,468,390 A | 11/1995 | Crivello | |
| 5,498,823 A | 3/1996 | Noble | |
| 5,547,551 A | 8/1996 | Bahar | |
| 5,550,199 A | 8/1996 | Ho | |
| 5,559,254 A | 9/1996 | Krug | |
| 5,582,735 A | 12/1996 | Mancusi, III | |
| 5,611,930 A | 3/1997 | Nguyen | |
| 5,643,442 A | 7/1997 | Sweet | |
| 5,670,052 A | 9/1997 | Ho | |
| 5,700,374 A | 12/1997 | Steinhauser | |
| 5,905,182 A | 5/1999 | Streicher | |
| 5,914,435 A | 6/1999 | Streicher | |
| 6,068,771 A | 5/2000 | McDermott | |
| 6,156,950 A | 12/2000 | Ragil | |
| 6,273,937 B1 * | 8/2001 | Schucker | B01D 53/22 210/640 |
| 6,423,784 B1 | 7/2002 | Hamrock | |
| 6,586,133 B1 | 7/2003 | Teeters | |
| 6,620,958 B2 | 9/2003 | Buchanan | |
| 6,622,663 B2 | 9/2003 | Weissman | |
| 6,702,945 B2 | 3/2004 | Saxton | |
| 6,800,371 B2 | 10/2004 | Gross | |
| 6,896,717 B2 | 5/2005 | Pinnau | |
| 6,972,093 B2 | 12/2005 | Partridge | |
| 7,029,574 B2 | 4/2006 | Yang | |
| 7,053,256 B2 | 5/2006 | Yang | |
| 7,148,389 B2 | 12/2006 | Yang | |
| 7,247,370 B2 | 7/2007 | Childs | |
| 7,303,675 B2 | 12/2007 | De La Cruz | |
| 7,314,565 B2 | 1/2008 | Sabottke | |
| 7,320,297 B2 | 1/2008 | Kamio | |
| 7,337,754 B2 | 3/2008 | Dearth | |
| 7,348,088 B2 * | 3/2008 | Hamrock | C08J 5/225 429/494 |
| 7,370,609 B2 | 5/2008 | Kamio | |
| 7,426,907 B2 | 9/2008 | Dearth | |
| 7,604,746 B2 | 10/2009 | Childs | |
| 7,638,053 B2 | 12/2009 | Yeager | |
| 7,642,393 B2 | 1/2010 | Wang | |
| 7,645,840 B2 | 1/2010 | Zook | |
| 7,647,899 B2 | 1/2010 | Dearth | |
| 7,708,151 B2 | 5/2010 | Peiffer | |
| 7,785,471 B2 | 8/2010 | Sabottke | |
| 7,803,275 B2 | 9/2010 | Partridge | |
| 7,842,124 B2 | 11/2010 | Partridge | |
| 7,919,141 B2 | 4/2011 | Tanioka | |
| 8,051,828 B2 | 11/2011 | Sengupta | |
| 8,056,732 B2 | 11/2011 | McKeown | |
| 8,083,946 B2 | 12/2011 | Sabottke | |
| 8,118,009 B2 | 2/2012 | Pursifull | |
| 8,119,006 B2 * | 2/2012 | Patil | B01D 61/246 210/500.27 |
| 8,231,013 B2 | 7/2012 | Chu | |
| 8,258,363 B2 | 9/2012 | Kalakkunnath | |
| 8,454,832 B2 | 6/2013 | Hamad | |
| 8,550,058 B2 | 10/2013 | Pursifull | |
| 8,562,825 B2 | 10/2013 | Partridge | |
| 8,580,111 B2 | 11/2013 | Partridge | |
| 8,597,518 B2 | 12/2013 | Parnas | |
| 8,729,197 B2 | 5/2014 | Kropp | |
| 8,741,445 B2 | 6/2014 | Bannai | |
| 8,765,824 B2 | 7/2014 | Shaffer | |
| 8,827,086 B2 | 9/2014 | Ansorge | |
| 9,056,283 B2 | 6/2015 | Yahaya | |
| 9,303,222 B2 | 4/2016 | Keuken | |
| 2002/0139321 A1 | 10/2002 | Weissman | |
| 2002/0144944 A1 | 10/2002 | Arcella | |
| 2002/0161066 A1 | 10/2002 | Remigy | |
| 2003/0134515 A1 | 7/2003 | David | |
| 2003/0163013 A1 | 8/2003 | Yang | |

(56) References Cited

U.S. PATENT DOCUMENTS

| | | |
|---|---|---|
| 2004/0000231 A1 | 1/2004 | Bikson |
| 2004/0024123 A1 | 2/2004 | Moya |
| 2004/0026321 A1 | 2/2004 | Minhas |
| 2004/0040891 A1 | 3/2004 | Yang |
| 2004/0044262 A1 | 3/2004 | Yang |
| 2004/0121210 A1 | 6/2004 | Hamrock |
| 2004/0144723 A1 | 7/2004 | Gloeckle |
| 2004/0149644 A1 | 8/2004 | Partridge |
| 2005/0103715 A1 | 5/2005 | Sabottke |
| 2005/0119517 A1 | 6/2005 | Millington |
| 2005/0154247 A1* | 7/2005 | Jong ............ C07C 7/144 585/862 |
| 2006/0000778 A1 | 1/2006 | Childs |
| 2006/0289352 A1 | 12/2006 | Yeager |
| 2007/0034192 A1 | 2/2007 | Kamio |
| 2007/0128425 A1 | 6/2007 | Hadj Romdhane |
| 2007/0221163 A1 | 9/2007 | Kamio |
| 2007/0234976 A1 | 10/2007 | Dearth |
| 2007/0272613 A1 | 11/2007 | Minhas |
| 2008/0011680 A1 | 1/2008 | Partridge |
| 2008/0035557 A1 | 2/2008 | Partridge |
| 2008/0035566 A1 | 2/2008 | Sabottke |
| 2008/0035572 A1 | 2/2008 | Sabottke |
| 2008/0035573 A1 | 2/2008 | Peiffer |
| 2008/0035575 A1 | 2/2008 | Partridge |
| 2008/0086021 A1 | 4/2008 | Wang |
| 2008/0200696 A1 | 8/2008 | Miller |
| 2008/0223785 A1 | 9/2008 | Miller |
| 2009/0026130 A1 | 1/2009 | Chikura |
| 2009/0157277 A1 | 6/2009 | Pursifull |
| 2009/0159057 A1 | 6/2009 | Pursifull |
| 2009/0242038 A1 | 10/2009 | Sengupta |
| 2009/0247805 A1 | 10/2009 | Bournay |
| 2009/0277837 A1 | 11/2009 | Liu |
| 2010/0018926 A1 | 1/2010 | Liu |
| 2010/0059441 A1 | 3/2010 | Pattil |
| 2010/0075101 A1 | 3/2010 | Tang |
| 2010/0108605 A1 | 5/2010 | Patil |
| 2010/0226823 A1 | 9/2010 | Rakhman |
| 2010/0325945 A1 | 12/2010 | Keuken |
| 2011/0091698 A1* | 4/2011 | Zhou ............ B01D 67/0006 428/212 |
| 2012/0074043 A1 | 3/2012 | Kalakkunnath |
| 2012/0132576 A1 | 5/2012 | Partridge |
| 2012/0132577 A1 | 5/2012 | Partridge |
| 2012/0132589 A1 | 5/2012 | Hamad |
| 2012/0186446 A1 | 7/2012 | Bara |
| 2012/0190091 A1 | 7/2012 | Huang |
| 2012/0270958 A1* | 10/2012 | Shaffer ............ B01D 71/46 521/27 |
| 2013/0000181 A1 | 1/2013 | Janssens |
| 2013/0029249 A1* | 1/2013 | Hamrock ............ C07C 315/04 429/492 |
| 2013/0043186 A1 | 2/2013 | Arakai |
| 2013/0098829 A1 | 4/2013 | Dontula |
| 2013/0101797 A1 | 4/2013 | Dontula |
| 2013/0118983 A1 | 5/2013 | Livingston |
| 2013/0125816 A1 | 5/2013 | David |
| 2013/0134515 A1 | 5/2013 | Zhou |
| 2013/0184503 A1 | 7/2013 | Frania |
| 2013/0228515 A1 | 9/2013 | Yahaya |
| 2014/0142363 A1 | 5/2014 | Partridge |
| 2015/0353853 A1 | 12/2015 | Iwashita |
| 2018/0154311 A1* | 6/2018 | Zhou ............ B01D 61/362 |

FOREIGN PATENT DOCUMENTS

| | | |
|---|---|---|
| CN | 101121101 | 6/2010 |
| CN | 202150515 | 2/2012 |
| CN | 102688708 | 1/2014 |
| CN | 104117290 | 4/2016 |
| CN | 105289340 | 10/2017 |
| DE | 3927787 | 2/1991 |
| DE | 10326354 | 1/2005 |
| DE | 102007049203 | 4/2009 |
| EP | 0312375 | 4/1989 |
| EP | 0312376 | 4/1989 |
| EP | 0254359 | 9/1991 |
| EP | 0326076 | 7/1994 |
| EP | 0649676 | 4/1995 |
| EP | 0526203 | 6/1995 |
| EP | 0760250 | 3/1997 |
| EP | 0760251 | 3/1997 |
| EP | 0760252 | 3/1997 |
| EP | 0811420 | 1/2004 |
| EP | 1372822 | 5/2006 |
| EP | 2041048 | 5/2011 |
| EP | 1637214 | 12/2013 |
| FR | 2937468 | 4/2010 |
| JP | S59-068535 | 4/1984 |
| JP | S59-206006 | 11/1984 |
| JP | S60-255106 | 12/1985 |
| JP | S61-257205 | 11/1986 |
| JP | H02-138136 | 5/1990 |
| JP | H07-088343 | 4/1995 |
| JP | H10-314551 | 12/1998 |
| JP | 2000-157843 | 6/2000 |
| JP | 2001-038156 | 2/2001 |
| JP | 3161562 | 4/2001 |
| JP | 3872605 | 1/2007 |
| JP | 2010-001755 | 1/2010 |
| JP | 2011-026552 | 2/2011 |
| JP | 4900328 | 3/2012 |
| KR | 20120000853 | 1/2012 |
| KR | 2015-0100029 | 9/2015 |
| KR | 10-1568119 | 11/2015 |
| RU | 2129910 | 5/1999 |
| WO | WO 97-017129 | 5/1997 |
| WO | WO 2003-008078 | 1/2003 |
| WO | WO 2005-102503 | 11/2005 |
| WO | WO 2009-006307 | 1/2009 |
| WO | WO 2009-094996 | 8/2009 |
| WO | WO 2010-002501 | 1/2010 |
| WO | WO 2010-101293 | 9/2010 |
| WO | WO 2011-018919 | 2/2011 |
| WO | WO 2012-021258 | 2/2012 |
| WO | WO 2012-038110 | 3/2012 |
| WO | WO 2013-010860 | 1/2013 |
| WO | WO 2013-151835 | 10/2013 |
| WO | WO 2014-113020 | 7/2014 |
| WO | WO 2015-103063 | 7/2015 |
| WO | WO 2017-004495 | 1/2017 |
| WO | WO 2017-004496 | 1/2017 |

OTHER PUBLICATIONS

Brun, "Separation of Hydrocarbon Mixtures by Pervaporation Through Rubbers", Membranes and Membrane Processes, Jan. 1986, pp. 335-341.

Cabasso, "Organic Liquid Mixtures Separation by Permselective Polymer Membranes. 1. Selection and Characteristics of Dense Isotropic Membranes Employed in the Pervaporation Process", Industrial & Engineering Chemistry Product Research and Development, 1983, vol. 22, No. 2, pp. 313-319.

Chang, "Octane-on-Demand as an Enable for Highly Efficient Spark Ignition Engines and Greenhouse Gas Emissions Improvement", SAE Technical Paper 2015-01-1264, Apr. 2015, 17 pages.

Childs, "Nanofiltration Using Pore-Filled Membranes: Effect of Polyelectrolyte Composition on Performance", Separation and Purification Technology, Mar. 2001, vol. 22-23, pp. 507-517.

Chishima, "Study of Ethanol-Gasoline Onboard Separation System for Knocking Suppression", Japan Society of Automotive Engineers (JASE) Technical Paper 20159380, Sep. 2015, 8 pages.

Chu, "Preparation of Thermo-Responsive Core-Shell Microcapsules with a Porous Membrane and Poly(N-Isopropylacrylamide) Gates", Journal of Membrane Science, Oct. 2001, vol. 192, No. 1-2, pp. 27-39.

Cunha, "Removal of Aromatics from Multicomponent Organic Mixtures by Pervaporation Using Polyurethane Membranes: Experimental and Modelling", Journal of Membrane Science, 2002, vol. 206, pp. 277-290.

(56) References Cited

OTHER PUBLICATIONS

Dutta, "Separation of Azeotropic Organic Liquid Mixtures by Pervaporation", American Institute of Chemical Engineers (AIChE) Journal, Apr. 1991, vol. 37, No. 4, pp. 581-588.
Fang, "Pervaporation Properties of Ethynyl-Containing Copolyimide Membranes to Aromatic/Non-Aromatic Hydrocarbon Mixtures", Polymer, 1999, vol. 40, pp. 3051-3059.
Frahn, "Generation of a Selective Layer on Polyacrylonitrile Membrane Supports for Separation of Aromatic/Non-Aromatic Hydrocarbon Mixtures by Pervaporation", Macromolecular Symposia, Feb. 2001, vol. 164, No. 1, pp. 269-276.
Frahn, "Photo-Initiated Generation of a Selective Layer on Polyacrylontrile (PAN) Composite Membranes", Journal of Materials Processing Technology, Dec. 2003, vol. 143-144, pp. 277-280.
Frahn, "Separation of Aromatic/Aliphatic Hydrocarbons by Photo-Modified Poly(Acrylonitrile) Membranes", Journal of Membrane Science, May 2004, vol. 234, Nos. 1-2, pp. 55-65.
Garcia-Aleman, "Experimental Analysis, Modeling, and Theoretical Design of McMaster Pore-Filled Nanofiltration Membranes", Journal of Membrane Science, Sep. 2004, vol. 240, Nos. 1-2, pp. 237-255.
Girnus, "Synthesis of $AlPO_4$-5 Aluminum Phosphate Molecular Sieve Crystals for Membrane Applications by Microwave Heating", Advanced Materials, 1995, vol. 7, No. 8, pp. 711-714.
Hao, "The Pervaporation Properties of Sulfonyl-Containing Polyimide Membranes to Aromatic-Aliphatic Hydrocarbon Mixtures", Journal of Membrane Science, 1997, vol. 132, pp. 97-108.
Heitmann, "Influencing the Pervaporative Recovery of N-Butanol by Using Ionic Liquids", Procedia Engineering, Jan. 2012, vol. 44, pp. 1343-1344.
Heywood, "High Compression Ratio Turbo Gasoline Engine Operation Using Alcohol Enhancement", Final Report on US DOE Funded Project DE-EE0005444, Massachusetts Institute of Technology Sloan Automotive Laboratory, Cambridge, MA., Jan. 2016, 168 pages.
Hiemenz, Polymer Chemistry—The Basic Concepts (1984), 7 pages.
Hofmann, "Molecular Modelling of Pervaporation Separation of Binary Mixtures with Polymeric Membranes", Journal of Membrane Science, 1998, vol. 144, pp. 145-159.
Hoshi, "Separation of Organic Solvent from Dilute Aqueous Solutions and from Organic Solvent Mixtures Through Crosslinked Acrylate Copolymer Membranes by Pervaporation", Journal of Applied Polymer Science, 1998, vol. 69, pp. 1483-1494.
"Hydranautics: Spiral Wound Reverse Osmosis Elements" A 3.23-minute video available on YouTube, published on Dec. 11, 2007, [Last Accessed on Mar. 9, 2018], URL <https://www.youtube.com/watch?v=YIMGZWmh_Mw>, 2 pages.
Katarzynski, "Permeation Properties of Different Aromatic Substances in Multicomponent Aromatic/Aliphatic Pervaporation Experiments", Desalination, 2006, vol. 200, pp. 23-25.
Katarzynski, "Separation of Multi Component Aromatic-Aliphatic Mixtures by Pervaporation with Copolyimide Membranes", Desalination, 2006, vol. 189, pp. 81-86.
Kim, "Quantitative Microscopic Study of Surface Characteristics of Ultrafiltration Membranes", Journal of Membrane Science, Nov. 1990, vol. 54, Nos. 1-2, pp. 89-102.
Kim, "Selective Permeation of $CO_2$ Through Pore-Filled Polyacrylonitrile Membrane with Poly(Ethylene Glycol)", Journal of Membrane Science, May, 2001, vol. 186, pp. 97-107.
Koelsch, "Zeolite-in-Metal Membranes: Preparation and Testing", Journal of the Chemical Society, Chemical Communications, 1994, vol. 21, pp. 2491-2492.
Kudo, "Research on Engine System making Effective Use of Bio-ethanol-blended Fuels", Japan Society of Automotive Engineers Technical Paper 20135048, JSAE Annual Congress (Spring), May 2013, 4 pages.
Larchet, "Separation of Benzene-n-Heptane Mixtures by Pervaporation with Elastomeric Membranes. I. Performance of Membranes", Journal of Membrane Science, 1983, vol. 15, pp. 81-96.
Larchet, "Separation of Benzene-n-Heptane Mixtures by Pervaporation with Elastomeric Membranes. II. Contribution of Sorption to the Separation Mechanism", Journal of Membrane Science, 1984, vol. 17, pp. 263-274.
Larchet, "Study of the Pervaporation of Aromatic and Aliphatic Hydrocarbon Mixtures Through Different Elastomer Membranes", *Chimiques*, 1979, vol. 287, pp. 31-34.
Li, "A Novel Atmospheric Dielectric Barrier Discharge (DBD) Plasma Graft-Filling Technique to Fabricate the Composite Membranes for Pervaporation of Aromatic-Aliphatic Hydrocarbons", Journal of Membrane Science, Apr. 2011, vol. 371, pp. 163-170.
Lopergolo, "Direct UV Photocrosslinking of Poly(N-Vinyl-2-Pyrrolidone) (PVP) to Produce Hydrogels", Polymer, Sep. 2003, vol. 44, No. 20, pp. 6217-6222.
Martinez De Yuso, "A Study of Chemical Modifications of a Nafion Membrane by incorporation of Different Room Temperature Ionic Liquids", Fuel Cells, Aug. 2012, vol. 12, No. 4, pp. 606-613.
Matsui, "A Simple Model for Pervaporative Transport of Binary Mixtures Through Rubbery Polymeric Membranes", Journal of Membrane Science, 2004, vol. 235, pp. 25-30.
Matsui, "Pervaporation Separation of Aromatic-Aliphatic Hydrocarbons by Crosslinked Poly(Methyl Acrylate-Co-Acrylic Acid) Membranes", Journal of Membrane Science, 2002, vol. 195, pp. 229-245.
Matsui, "Pervaporation Separation of Aromatic-Aliphatic Hydrocarbons by a Series of Ionically Crosslinked Poly(N-Alkyl Acrylate) Membranes", Journal of Membrane Science, 2003, vol. 213, pp. 67-83.
Miendersma, "Economical Feasibility of Zeolite Membranes for Industrial Scale Separations of Aromatic Hydrocarbons", Desalination, 2002, vol. 149, pp. 29-34.
Mika, "Ultra-Low-Pressure Water Softening with Pore-Filled Membranes", Desalination, Nov. 2001, vol. 140, No. 3, pp. 265-275.
Navarro, "Pore-Filling Electrolyte Membranes Based on Microporous Polyethylene Matrices Activated with Plasma and Sulfonated Hydrogenated Styrene Butadiene Block Copolymer. Synthesis, Microstructural and Electrical Characterization", Journal of Polymer Science, Part B: Polymer Physics, Aug. 2008, vol. 46, No. 16, pp. 1684-1695.
Ohst, "Polymer Structure-Properties Correlation of Polyurethane PV-Membranes for Aromatic/Aliphatic Separation", Proceedings of 5th International Conference on Pervaporation Processes in the Chemical Industry, Heidelberg, Germany, Mar. 1991, pp. 7-21.
Okada, "Predictability of Transport Equations for Pervaporation on the Basis of Pore-Flow Mechanism", Journal of Membrane Science, 1992, vol. 70, pp. 163-175.
Okamoto "Pervaporation of Aromatic/Non-Aromatic Hydrocarbon Mixtures Through Crosslinked Membranes of Polyimide with Pendant Phosphonate Ester Groups", Journal of Membrane Science, 1999, vol. 157, pp. 97-105.
Pandey, "Formation and Characterization of Highly Crosslinked Anion-Exchange Membranes", Journal of Membrane Science, Jun. 2003, vol. 217, pp. 117-130.
Partridge, "Onboard Gasoline Separation for Improved Vehicle Efficiency", SAE International Journal of Fuels and Lubricants, Jun. 2014, vol. 7, No. 2, pp. 366-378.
Peeva, "Factors Affecting the Sieving Behavior of Anti-Fouling Thin-Layer Cross-Linked Hydrogel Polyethersulfone Composite Ultrafiltration Membranes", Journal of Membrane Science, Feb. 2012, vol. 390-391, pp. 99-112.
Pithan, "Polymeric Membranes for Aromatic/Aliphatic Separation Processes", ChemPhysChem, 2002, vol. 3, pp. 856-862.
Qiu, "Nanofiltration Membrane Prepared from Cardo Polyetherketone Ultrafiltration Membrane by UV-Induced Grafting Method", Journal of Membrane Science, Jun. 2005, vol. 255, pp. 107-115.
Ray, "Development of New Synthetic Membranes for Separation of Benzene-Cyclohexane Mixtures by Pervaporation: A Solubility Parameter Approach", Industrial & Engineering Chemistry Research, 1997, vol. 36, pp. 5265-5276.
Ren, "Separation of Aromatics/Aliphatics with Crosslinked 6FDA-Based Copolyimides", Separation and Purification Technology, 2001, vol. 22-23, pp. 31-43.

(56) References Cited

OTHER PUBLICATIONS

Robeson, "Poly(Trimethylsilylpropyne) Utility as a Polymeric Absorbent for Removal of Trace Organics from Air and Water Sources", Separation Science and Technology, 1992, vol. 27, No. 10, pp. 1245-1258.

Roizard, "Preparation and Study of Crosslinked Polyurethane Films to Fractionate Toluene-N-Heptane Mixtures by Pervaporation", Separation and Purification Technology, 2001, vol. 22-23, pp. 45-52.

Schauer, "Polyurethane pervaporation membranes", Die Angewandte Makromolekulare Chemie, 1999, vol. 268, pp. 41-45.

Schepers, "Molecular Simulation Study on Sorption and Diffusion Processes in Polymeric Pervaporation Membrane Materials", Molecular Simulation, Feb. 2006, vol. 32, No. 2, pp. 73-83.

Schwarz, "Polyelectrolyte membranes for Aromatic-Aliphatic Hydrocarbon Separation by Pervaporation", Journal of Membrane Science, 2005, vol. 247, pp. 143-152.

Scindia, "Coupled-Diffusion Transport of Cr(VI) Across Anion-Exchange Membranes Prepared by Physical and Chemical Immobilization Methods", Journal of Membrane Science, Mar. 2005, vol. 249, pp. 143-152.

"Scotch-Weld Brand DP-760 Part A", 3M Material Safety Data Sheet, Aug. 2008, 8 pages.

"Scotch-Weld Brand DP-760 Part B", 3M Material Safety Data Sheet, Feb. 2007, 7 pages.

Semenova, "Polymer Membranes for Hydrocarbon Separation and Removal", Journal of Membrane Science, Mar. 2004, vol. 231, pp. 189-207.

Smitha, "Separation of Organic-Organic Mixtures by Pervaporation—A Review", Journal of Membrane Science, Sep. 2004, vol. 241, No. 1, pp. 1-21.

Stephan "Separation of Aliphatic/Aromatic Mixtures by Pervaporation Using Polyurethane Membranes. Model Calculations and Comparison with Experimental Results", Proceedings of Sixth International Conference on Pervaporation Processes in the Chemical Industry: Ottawa, Canada, Sep. 1992, pp. 292-304.

Stewart, "Membrane Separations Using Functionalized Polyphosphazene Materials", ACS Symposium Series, 2004, vol. 876, pp. 177-189.

Thompson, "Theoretical Transport Model of Diffusive Membrane Pervaporation and Comparison of Model Predictions with Experimental Results", American Institute of Chemical Engineers National Meeting, Houston, Texas, Apr. 1987, 12 pages.

Ueda, "Membrane Separation of Ethanol from Mixtures of Gasoline and Bioethanol with Heat-Treated PVA Membranes", Industrial & Engineering Chemistry Research, 2011, vol. 50, No. 2, pp. 1023-1027.

Ulbricht, "Novel High-Performance Photo-Graft Composite Membranes for Separation of Organic Liquids by Pervaporation," Journal of Membrane Sciences, Dec. 1997, vol. 136, pp. 25-33.

Van Ackern, "Ultrathin Membranes for Gas Separation and Pervaporation Prepared Upon Electrostatic Self-Assembly of Polyelectrolytes", Thin Solid Films, 1998, vol. 327329, pp. 762-766.

Villaluenga, "A Review on the Separation of Benzene-Cyclohexane Mixtures by Pervaporation Processes", Journal of Membrane Sciences, May 2000, vol. 169, No. 2, pp. 159-174.

Wang, "Crosslinking of Polyvinyl Chloride by Electron Beam Irradiation in the Presence of Ethylene-Vinyl Acetate Copolymer", Journal of Applied Polymer Science, 2004, vol. 91, pp. 1571-1575.

Wang, "Pervaporation of Aromatic-Non-Aromatic Hydrocarbon Mixtures Through Plasma-Grafted Membranes", Journal of Membrane Science, Mar. 1999, vol. 154, No. 2, pp. 221-228.

Wang, "Pervaporation Properties of Aromatic-Nonaromatic Hydrocarbons of Crosslinked Membranes of Copolymers Based on Diethyl Vinylbenzylphosphonate", Journal of Applied Polymer Science, 2003, vol. 87, pp. 2177-2185.

Wang, "Pervaporation Properties to Aromatic-Non-Aromatic Hydrocarbon Mixtures of Cross-Linked Membranes of Copoly(Methacrylates) With Pendant Phosphate and Carbamoylphosphonate Groups", Journal of Membrane Science, Apr. 2002, vol. 199, No. 1-2, pp. 13-27.

Wang, "Preparation and Properties of Pore-Filling Membranes Based on Sulfonated Copolyimides and Porous Polymide Matrix," Polymer, Jul. 2012, vol. 53, No. 15, pp. 3154-3162.

Wang, "Self-initiated Photopolymerization and Photografting of Acrylic Monomers," Macromolecular Rapid Communications, May 2004, vol. 25, No. 11, pp. 1095-1099.

Wang, "Sorption and Pervaporation Properties of Crosslinked Membranes of Poly(Ethylene Oxide Imide) Segmented Copolymer to Aromatic/Nonaromatic Hydrocarbon Mixtures", Journal of Polymer Science: Part B, Polymer Physics, Jul. 2000, vol. 38, No. 13, pp. 1800-1811.

White, "Development of Large-Scale Applications in Organic Solvent Nanofiltration and Pervaporation for Chemical and Refining Processes", Journal of Membrane Science, Dec. 2006, vol. 286, No. 1-2, pp. 26-35.

White, "New Applications of Organic Solvent Nanofiltration and Pervaporation in Chemical and Refining Processes", AIChE Paper, AIChE Annual Meeting 2005, 2 pages.

Wight, "Oxygen Inhibition of Acrylic Photopolymerization," Journal of Polymer Science Part C, Polymer Letters Edition, Mar. 1978, vol. 16, No. 3, pp. 121-127.

Xu, "Carboxylic Acid Containing Polyimides for Pervaporation Separations of Toluene-iso-Octane Mixtures", Journal of Membrane Science, Jul. 2003, vol. 219, No. 1-2, pp. 89-102.

Yamaguchi, "A Pore-Filling Electrolyte Membrane-Electrode Integrated System for a Direct Methanol Fuel Cell Application", Journal of Electrochemical Society, 2002, vol. 149, No. 11, pp. A1448-A1453.

Yamaguchi, "An Extremely Low Methanol Crossover and Highly Durable Aromatic Pore-Filling Electrolyte Membrane for Direct Methanol Fuel Cells", Advanced Materials, Feb. 2007, vol. 19, No. 4, pp. 592-596.

Yamaguchi, "Plasma-Graft Filling Polymerization: Preparation of a New Type of Pervaporation Membrane for Organic Liquid Mixtures", Macromolecules, 1991, vol. 24, pp. 5522-5527.

Yamaguchi, "Solubility and Pervaporation Properties of the Filling—Polymerized Membrane Prepared by Plasma-Graft Polymerization for Pervaporation of Organic-Liquid Mixtures", Industrial & Engineering Chemistry Research, 1992, vol. 31, pp. 1914-1919.

Yang, "Advances in Pervaporation Membranes for Separating Mixtures of Aromatic and Aliphatic Hydrocarbons", Progress in Chemistry, Jul. 2001, vol. 13, No. 4, pp. 303-309.

Yeom, "A New Method for Determining the Diffusion Coefficients of Penetrants Through Polymeric Membranes from Steady-State Pervaporation Experiments", Journal of Membrane Science, 1992, vol. 68, pp. 11-20.

Yildrim "Separation of Benzene-Cyclohexane Mixtures by Pervaporation using Peba Membranes", Desalination, Jan. 2008, vol. 219, No. 1-3, pp. 14-25.

Yoo, "$CO_2$ Separation Membranes Using Ionic Liquids in a Nafion Matrix", Journal of Membrane Science, Nov. 2010, vol. 363, pp. 72-79.

Yuan Xu, "Synthesized Polyimide Membranes for Pervaporation Separations of Toluene-Iso-Octane Mixtures", The University of Texas Thesis, Dec. 2005, 187 pages.

Zeng, "A New Group-Contribution Model of Mass Transport Through Dense Polymeric Membrane and Its Application I: A Universal Model Format for Dense Polymeric Membrane", ACS Paper, 232nd National Meeting, Sep. 2006, 1 page.

Zhao, "Functionalized Metal-Organic Polyhedra Hybrid Membranes for Aromatic Hydrocarbons Recovery", The American Institute of Chemical Engineers(AIChE) Journal, Oct. 2016, vol. 62, No. 10, pp. 3706-3716.

Zhao, "Sorption and Transport of Methanol and Ethanol in $H^+$-Nafion", Polymer, Mar. 2012, vol. 53, No. 6, pp. 1267-1276.

International Search Report for PCT International Application No. PCT/US2016/040653, dated Sep. 20, 2016, 5 pages.

\* cited by examiner

COMPOSITE MEMBRANES WITH IMPROVED PERFORMANCE AND/OR DURABILITY AND METHODS OF USE

CROSS REFERENCE TO RELATED APPLICATIONS

This application is a national stage filing under 35 U.S.C. 371 of PCT/US2016/040653, filed Jul. 1, 2016, which claims the benefit of U.S. Provisional Application No. 62/187,505, filed Jul. 1, 2015, the disclosures of which are incorporated by reference in their entireties herein.

BACKGROUND

Separation membranes are known; however, there is a continual need for effective composite membranes.

SUMMARY OF THE INVENTION

The present disclosure provides composite membranes and methods of use of such membranes in separation techniques. Generally, the composite membranes include a porous substrate (i.e., a support substrate that may include one or more layers) that includes opposite first and second major surfaces, and a plurality of pores; and a pore-filling polymer disposed in at least some of the plurality of pores so as to form a layer having a thickness within the porous substrate.

Composite membranes of the present disclosure further include at least one of: (a) an ionic liquid (i.e., a liquid ionic compound) mixed with the pore-filling polymer; or (b) an amorphous fluorochemical film disposed on the composite membrane.

In certain embodiments the layer is a continuous layer. For composite membranes that are asymmetric, the amount of the polymer at, or adjacent to, the first major surface is greater than the amount of the polymer at, or adjacent to, the second major surface.

Such membranes are particularly useful for selectively pervaporating a first liquid from a mixture that includes the first liquid and a second liquid, generally because the pore-filling polymer is more permeable to the first liquid than the second liquid. Furthermore, in certain embodiments, the pore-filling polymer is not soluble in the first liquid, the second liquid, or a mixture thereof.

In one embodiment, the present disclosure provides an asymmetric composite membrane for selectively pervaporating alcohol from an alcohol and gasoline mixture. The asymmetric composite membrane includes: a porous substrate having opposite first and second major surfaces, and a plurality of pores; and a pore-filling polymer disposed in at least some of the pores so as to form a layer having a thickness within the porous substrate, with the amount of the polymer at, or adjacent to, the first major surface being greater than the amount of the polymer at, or adjacent to, the second major surface, wherein the polymer is more permeable to alcohol than gasoline (and, in certain embodiments, not soluble in alcohol, gasoline, or a combination thereof). Such asymmetric composite membrane further includes at least one of: (a) an ionic liquid (i.e., a liquid ionic compound) mixed with the pore-filling polymer; or (b) an amorphous fluorochemical film disposed on the composite membrane.

Such membranes may be included in a cartridge, which may be part of a system such as a flex-fuel engine.

The present disclosure also provides methods. For example, the present disclosure provides a method of separating a first liquid (e.g., ethanol) from a mixture of the first liquid (e.g., ethanol) and a second liquid (e.g., gasoline), the method comprising contacting the mixture with a composite membrane (preferably, an asymmetric composite membrane) as described herein.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

Figure 1:
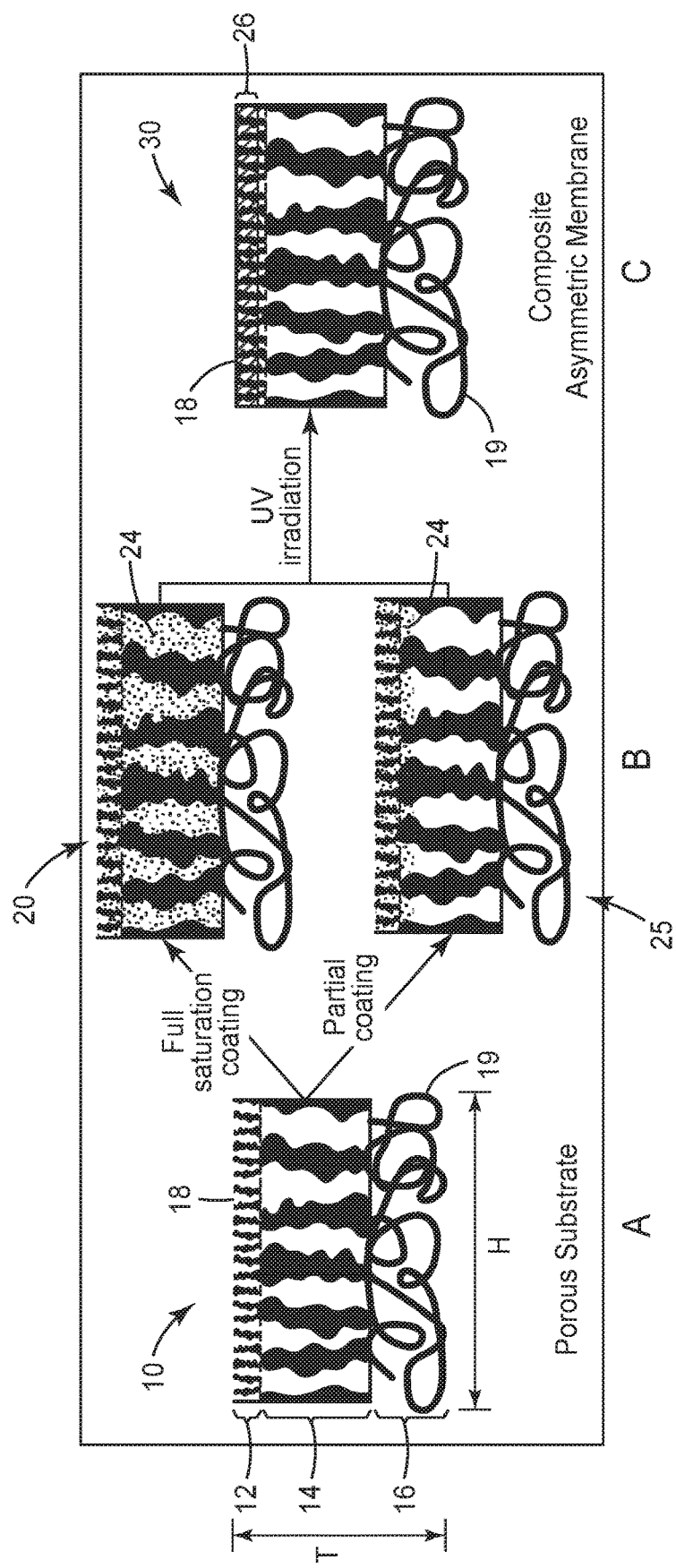
FIG. 1 is a cross-sectional schematic view of an exemplary porous substrate 10 and an asymmetric composite membrane 30 of the present disclosure.

The present disclosure provides composite membranes (preferably, asymmetric composite membranes) that include a porous substrate and a pore-filling polymer. The porous substrate has opposite first and second major surfaces, and a plurality of pores. The pore-filling polymer is disposed in at least some of the pores.

Composite membranes of the present disclosure further include at least one of: (a) an ionic liquid (i.e., a liquid ionic compound) mixed with the pore-filling polymer; or (b) an amorphous fluorochemical film disposed on the composite membrane, typically, on the side of the membrane the feed mixture enters. Such composite membranes demonstrate improved performance (e.g., flux) and/or durability over the same composite membranes without either the liquid ionic compound or the amorphous fluorochemical film.

In certain embodiments in which the composite membranes are asymmetric composite membranes the amount of the pore-filling polymer at, or adjacent to, the first major surface is greater than the amount of the pore-filling polymer at, or adjacent to, the second major surface. Hence, a composite membrane is asymmetric with respect to the amount of pore-filling polymer throughout the thickness of the porous substrate.

Such composite membranes may be used in various separation methods, including pervaporation, gas separation, vapor permeation, nanofiltration, organic solvent nanofiltration, and combinations thereof (e.g., a combination of pervaporation and vapor permeation). Such separation methods may be used to separate a first fluid (i.e., liquid and/or vapor) from a feed mixture of a first fluid (i.e., liquid and/or vapor) and a second fluid (i.e., liquid and/or vapor). The preferred separation membranes of the present disclosure are particularly useful in pervaporation methods to separate a first liquid from a feed mixture of a first liquid and a second liquid.

Pervaporation is a process that involves a membrane in contact with a liquid on the feed or upstream side and a vapor on the "permeate" or downstream side. Usually, a vacuum and/or an inert gas is applied on the vapor side of the membrane to provide a driving force for the process. Typically, the downstream pressure is lower than the saturation pressure of the permeate.

Vapor permeation is quite similar to pervaporation, except that a vapor is contacted on the feed side of the membrane instead of a liquid. As membranes suitable for pervaporation separations are typically also suitable for vapor permeation separations, use of the term "pervaporation" may encompass both "pervaporation" and "vapor permeation."

Pervaporation may be used for desulfurization of gasoline, dehydration of organic solvents, isolation of aroma compounds or components, and removal of volatile organic compounds from aqueous solutions. In certain embodiments of the present disclosure, the asymmetric composite membranes are used for pervaporating alcohol from an alcohol and gasoline mixture.

There is a need for highly selective membranes. Traditional composite membranes include a selective thin polymer coating supported on an underlying porous support. Such selective layers will absorb one or more components in a mixture to be separated, which causes their swelling. The swelling will not only decrease mechanical strength but also affect membrane performance. Introduction of chemical crosslinking density or impermeable physical regions could restrain the material swelling to some extent, but this may reduce the permeability. Thus, there is a challenge to create a membrane with effective pervaporation performance and mechanical strength. Also, it is challenging to apply a very thin coating without causing defects or pinholes. One or more composite membranes of the present disclosure have solved one or more of these problems and provide an appropriate balance of properties.

Generally, the composite membranes of the present disclosure include a porous substrate (i.e., a support substrate which may be in the form of one or more porous layers) that includes opposite first and second major surfaces, and a plurality of pores; and a pore-filling polymer disposed in at least some of the plurality of pores so as to form a layer having a thickness within the porous substrate. In certain embodiments, the pore-filling polymer layer is preferably a continuous layer. The amount of the polymer at, or adjacent to, the first major surface is greater than the amount of the polymer at, or adjacent to, the second major surface in an asymmetric composite membrane.

Referring to FIG. 1, illustrations of an exemplary porous substrate 10 (FIG. 1A) and an exemplary asymmetric composite membrane 30 (FIG. 1C), with intermediates 20 and 25 (FIG. 1B), are shown in vertical cross-section. The exemplary porous substrate 10 includes three layers that include a nanopororous layer 12, a microporous layer 14, and a macroporous layer 16 (FIG. 1A) having a first major surface 18 and a second major surface 19. During processing, various intermediates could be formed. Two examples of intermediates are shown as 20 and 25 in FIG. 1B. The porous substrate 10 may be fully saturated with a curable pore-filling polymer composition 24 to create intermediate 20 (top panel of FIG. 1B), or the porous substrate 10 may be only partially filled with a curable pore-filling polymer composition 24 to create intermediate 25 (bottom panel of FIG. 1B). That is, the curable pore-filling polymer composition 24 may be disposed in at least some of the plurality of pores. Once the curable (i.e., polymerizable and/or crosslinkable) pore-filling polymer composition 24 is exposed to a radiation source, such as an ultraviolet radiation source, and cured (i.e., polymerized and/or crosslinked), and the uncured pore-filling polymer composition washed away (if there is any), a pore-filling polymer layer 26 is formed. That is, whether the porous substrate is initially fully saturated with (as in intermediate 20), or only partially filled with (as in intermediate 25), the pore-filling polymer, upon being cured and the uncured portion washed away, forms a polymer layer 26. In certain embodiments, this polymer layer 26 has a thickness and is formed within the porous substrate 10, such that the amount of the polymer at, or adjacent to, the first major surface 18 is greater than the amount of the polymer at, or adjacent to, the second major surface 19, thereby forming an exemplary asymmetric composite membrane 30 of the present disclosure (FIG. 1C).

In a porous substrate 10, the pores are interconnected vertically (i.e., throughout the thickness "T" of the porous substrate 10, see FIG. 1A). In certain preferred embodiments, the pores of the porous substrate 10 are interconnected horizontally (e.g., as in a microfiltration membrane) along dimension "H" (see FIG. 1A). In such embodiments, the pore-filling polymer layer 26 (FIG. 1C) formed by the pore-filling polymer 24 is preferably a continuous layer. If the pores of the porous substrate 10 are not all interconnected horizontally (along dimension "H"), the layer 26 is discontinuous (i.e., the pore-filling polymer forms a plurality of discreet regions within the porous substrate). It will be understood that dimension "H" generally refers to the plane of the porous substrate and is exemplary of all the various horizontal dimensions within a horizontal slice of the substrate (shown in vertical cross-section). Whether layer 26 is continuous or discontinuous, for the asymmetric composite membrane, the amount of the pore-filling polymer at, or adjacent to, the first major surface 18 is greater than the amount of the polymer at, or adjacent to, the second major surface 19.

Figure 12:
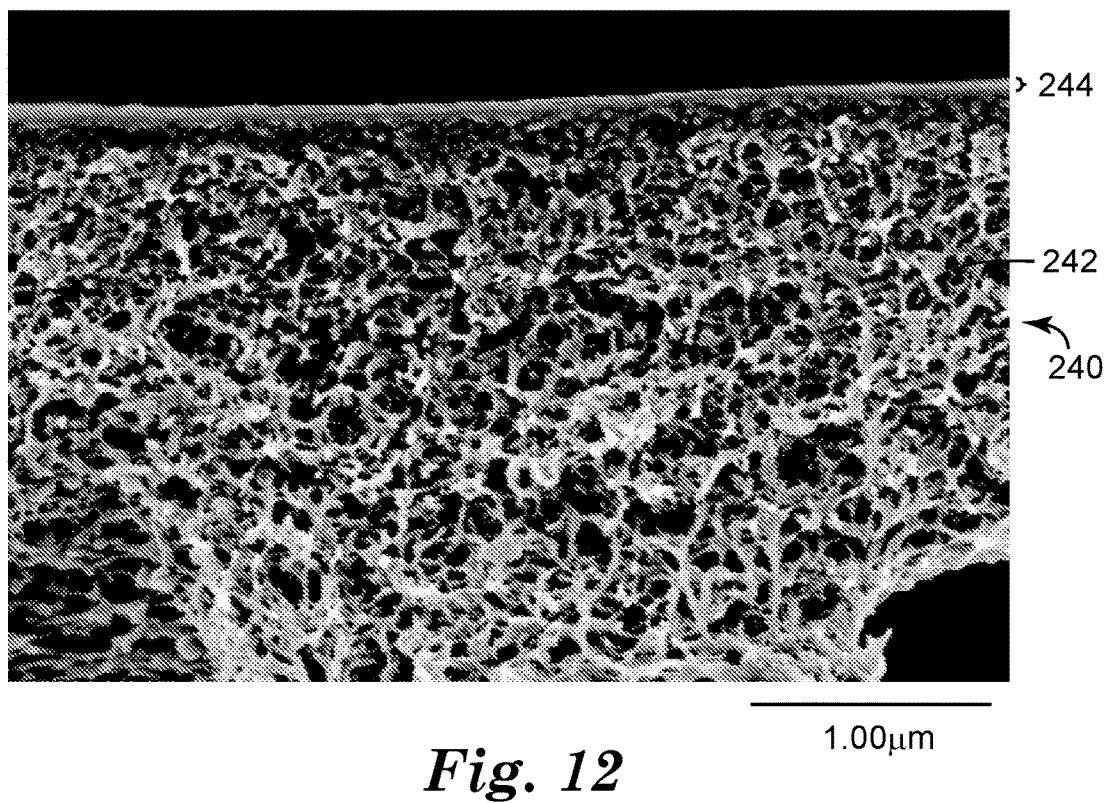
FIG. 12 shows a cross-sectional image of an asymmetric composite membrane of the present disclosure prepared according to Example 23.

As a specific example, reference is to FIG. 12, which shows a cross-sectional image of an asymmetric composite membrane 240 of the present disclosure prepared according to Example 23. In this embodiment, the asymmetric composite membrane 240 includes one layer of a nanoporous substrate 242. The pore-filling polymer is shown in a continuous layer 244.

As used herein, a continuous layer refers to a substantially continuous layer as well as a layer that is completely continuous. A substantially continuous layer is a layer that is continuous enough that the asymmetric composite membrane is able to selectively pervaporate a desired amount of the first liquid (e.g., alcohol) from a mixture of the first liquid with a second liquid (e.g., gasoline). In particular, the flux and the selectivity of the composite membrane (with a "continuous layer" of pore-filling polymer) is sufficient for the particular system in which the membrane is used.

Such membranes are particularly useful for selectively pervaporating a first liquid from a mixture that includes the first liquid and a second liquid, generally because the pore-filling polymer is more permeable to the first liquid than the second liquid. Furthermore, in certain embodiments, the pore-filing polymer is not soluble in the first liquid, the second liquid, or a combination thereof.

In certain embodiments, the first liquid is a more polar liquid than the second liquid. The second liquid may be a nonpolar liquid.

In certain embodiments, the first liquid may be water, an alcohol (such as ethanol, methanol, 1-propanol, 2-propanol, 1-methoxy-2-propanol, or butanol), or an organic sulfur-containing compound (such as thiophene, tetrahydrothiophene, benzothiophene, 2-methylthiophene, or 2,5-dimethylthiophene).

In certain embodiments, the second liquid may be gasoline, an aliphatic or aromatic hydrocarbon (e.g., benzene, hexane, or cyclohexane), or an ether (such as methyl-tert-butylether, ethyl-tert-butylether).

In certain embodiments, the first liquid is an alcohol, and the second liquid is gasoline. Thus, in one embodiment of the present disclosure, an asymmetric composite membrane for selectively pervaporating alcohol from an alcohol and gasoline mixture is provided. This asymmetric composite membrane includes: a porous substrate having opposite first and second major surfaces, and a plurality of pores; and a pore-filling polymer disposed in at least some of the pores so as to form a continuous layer having a thickness, with the amount of the polymer at, or adjacent to, the first major surface being greater than the amount of the pore-filling polymer at, or adjacent to, the second major surface, wherein the polymer is more permeable to alcohol than gasoline.

Porous Substrate

The porous substrate itself may be asymmetric or symmetric. The porous substrate may include one layer or multiple layers. For example, there may be two, three, four, or more layers. In some embodiments, the porous substrate is hydrophobic. In other embodiments, the porous substrate is hydrophilic.

If the porous substrate is asymmetric (before being combined with the pore-filling polymer), the first and second major surfaces have porous structures with different pore morphologies. For example, the porous substrate may have pores of differing sizes throughout its thickness. Analogously, if the porous substrate is symmetric (before being combined with the pore-filling polymer), the major surfaces have porous structures wherein their pore morphologies are the same. For example, the porous substrate may have pores of the same size throughout its thickness.

Referring to FIG. 1A, an asymmetric substrate is shown with different pore morphologies at the first major surface 18 and the second major surface 19. More specifically, there are three layers each of different pore size such that the overall substrate has pores of differing sizes throughout its thickness "T." In certain embodiments, nanoporous layer 12 alone could function as the porous substrate. In such embodiments, the porous substrate would be symmetric.

Suitable porous substrates include, for example, films, porous membranes, woven webs, nonwoven webs, hollow fibers, and the like. For example, the porous substrates may be made of one or more layers that include films, porous films, micro-filtration membranes, ultrafiltration membranes, nanofiltration membranes, woven materials, and nonwoven materials. The materials that may be used for each of the above-mentioned supports may be organic in nature (such as the organic polymers listed below), inorganic in nature (such as aluminum, steels, and sintered metals and/or ceramics and glasses), or a combination thereof. For example, the porous substrate may be formed from polymeric materials, ceramic and glass materials, metal, and the like, or combinations (i.e., mixtures and copolymers) thereof.

In composite membranes of the present disclosure, materials that withstand hot gasoline environment and provide sufficient mechanical strength to the composite membranes are preferred. Materials having good adhesion to each other are particularly desirable. In certain embodiments, the porous substrate is preferably a polymeric porous substrate.

Suitable polymeric materials include, for example, polystyrene, polyolefins, polyisoprenes, polybutadienes, fluorinated polymers (e.g., polyvinylidene fluoride (PVDF), ethylene-co-chlorotrifluoroethylene copolymer (ECTFE), polytetrafluoroethylene (PTFE)), polyvinyl chlorides, polyesters (PET), polyamides (e.g., various nylons), polyimides, polyethers, poly(ether sulfone)s, poly(sulfone)s, poly(phenylene sulfone)s, polyphenylene oxides, polyphenylene sulfides (PPS), poly(vinyl acetate)s, copolymers of vinyl acetate, poly(phosphazene)s, poly(vinyl ester)s, poly(vinyl ether)s, poly(vinyl alcohol)s, polycarbonates, polyacrylonitrile, polyethylene terephthalate, cellulose and its derivatives (such as cellulose acetate and cellulose nitrate), and the like, or combinations (i.e., mixtures or copolymers) thereof.

Suitable polyolefins include, for example, poly(ethylene), poly(propylene), poly(1-butene), copolymers of ethylene and propylene, alpha olefin copolymers (such as copolymers of 1-butene, 1-hexene, 1-octene, and 1-decene), poly(ethylene-co-1-butene), poly(ethylene-co-1-butene-co-1-hexene), and the like, or combinations (i.e., mixtures or copolymers) thereof.

Suitable fluorinated polymers include, for example, polyvinylidene fluoride (PVDF), polyvinyl fluoride, copolymers of vinylidene fluoride (such as poly(vinylidene fluoride-co-hexafluoropropylene)), copolymers of chlorotrifluoroethylene (such as ethylene-co-chlorotrifluoroethylene copolymer), polytetrafluoroethylene, and the like, or combinations (i.e., mixtures or copolymers) thereof.

Suitable polyamides include, for example, poly(imino(1-oxohexamethylene)), poly(iminoadipoylimino hexamethylene), poly(iminoadipoyliminodecamethylene), polycaprolactam, and the like, or combinations thereof.

Suitable polyimides include, for example, poly(pyromellitimide), polyetherimide and the like.

Suitable poly(ether sulfone)s include, for example, poly (diphenylether sulfone), poly(diphenylsulfone-co-diphenylene oxide sulfone), and the like, or combinations thereof.

Suitable polyethers include, for example, polyetherether ketone (PEEK).

Such materials may be photosensitive or non-photosensitive. Photosensitive porous substrate materials may act as a photoinitiator and generate radicals which initiate polymerization under radiation sources, such as UV radiation, so that the filled polymer could covalently bond to the porous substrate. Suitable photosensitive materials include, for example, polysulfone, polyethersulfone, polyphenylenesulfone, PEEK, polyimide, PPS, PET, and polycarbonate. Photosensitive materials are preferably used for nanoporous layers.

Suitable porous substrates may have pores of a wide variety of sizes. For example, suitable porous substrates may include nanoporous membranes, microporous membranes, microporous nonwoven/woven webs, microporous woven webs, microporous fibers, nanofiber webs and the like. In some embodiments, the porous substrate may have a combination of different pore sizes (e.g., micropores, nanopores, and the like). In one embodiment, the porous substrate is microporous.

In some embodiments, the porous substrate includes pores that may have an average pore size less than 10 micrometers (μm). In other embodiments, the average pore size of the porous substrate may be less than 5 μm, or less than 2 μm, or less than 1 μm.

In other embodiments, the average pore size of the porous substrate may be greater than 10 nm (nanometer). In some embodiments, the average pore size of the porous substrate is greater than 50 nm, or greater than 100 nm, or greater than 200 nm.

In certain embodiments, the porous substrate includes pores having an average size in the range of from 0.5 nm up to and including 1000 μm. In some embodiments, the porous substrate may have an average pore size in a range of 10 nm to 10 μm, or in a range of 50 nm to 5 μm, or in a range of 100 nm to 2 μm, or in a range of 200 nm to 1 μm.

In certain embodiments, the porous substrate includes a nanoporous layer. In certain embodiments, the nanoporous layer is adjacent to or defines the first major surface of the porous substrate. In certain embodiments, the nanoporous layer includes pores having a size in the range of from 0.5 nanometer (nm) up to and including 100 nm. In accordance with the present disclosure, the size of the pores in the nanoporous layer may include, in increments of 1 nm, any range between 0.5 nm and 100 nm. For example, the size of the pores in the nanoporous layer may be in the range of from 0.5 nm to 50 nm, or 1 nm to 25 nm, or 2 nm to 10 nm, etc. Molecular Weight Cut-Off (MWCO) is typically used to correlate to the pore size. That is, for nanopores, the molecular weight of a polymer standard (retain over 90%) such as dextran, polyethylene glycol, polyvinyl alcohol, proteins, polystyrene, poly(methylmethacrylate) may be used to characterize the pore size. For example, one supplier of the porous substrates evaluates the pore sizes using a standard test, such as ASTM E1343-90-2001 using polyvinyl alcohol.

In certain embodiments, the porous substrate includes a microporous layer. In certain embodiments, the microporous layer is adjacent to or defines the first major surface of the porous substrate. In certain embodiments, the microporous layer includes pores having a size in the range of from 0.01 μm up to and including 20 μm. In accordance with the present disclosure, the size of the pores in the microporous layer may include, in increments of 0.05 μm, any range between 0.01 μm up and 20 μm. For example, the size of the pores in the microporous layer may be in the range of from 0.05 μm to 10 μm, or 0.1 μm to 5 μm, or 0.2 μm to 1 μm, etc. Typically, the pores in the microporous layer may be measured by mercury porosimetry for average or largest pore size, bubble point pore size measurement for the largest pores, Scanning Electron Microscopy (SEM) and/or Atom Force Microscopy (AFM) for the average/largest pore size.

In certain embodiments, the porous substrate includes a macroporous layer. In certain embodiments, the macroporous layer is adjacent to or defines the first major surface of the porous substrate. In certain embodiments, the macroporous layer is embedded between two microporous layers, for example a BLA020 membrane obtained from 3M Purification Inc.

In certain embodiments, the macroporous layer comprises pores having a size in the range of from 1 µm and 1000 µm. In accordance with the present disclosure, the size of the pores in the macroporous layer may include, in increments of 1 µm, any range between 1 µm up to and including 1000 µm. For example, the size of the pores in the macroporous substrate may be in the range of from 1 µm to 500 µm, or 5 µm to 300 µm, or 10 µm to 100 µm, etc. Typically, the size of the pores in the macroporous layer may be measured by Scanning Electron Microscopy, or Optical Microscopy, or using a Pore Size Meter for Nonwovens.

The macroporous layer is typically preferred at least because the macropores not only provide less vapor transport resistance, compared to microporous or nanoporous structures, but the macroporous layer can also provide additional rigidity and mechanical strength.

The thickness of the porous substrate selected may depend on the intended application of the membrane. Generally, the thickness of the porous substrate ("T" in FIG. 1A) may be greater than 10 micrometers (m). In some embodiments, the thickness of the porous substrate may be greater than 1,000 µm, or greater than 5,000 µm. The maximum thickness depends on the intended use, but may often be less than or equal to 10,000 µm.

In certain embodiments, the porous substrate has first and second opposite major surfaces, and a thickness measured from one to the other of the opposite major surfaces in the range of from 5 µm up to and including 500 µm. In accordance with the present disclosure, the thickness of the porous substrate may include, in increments of 25 µm, any range between 5 µm and 500 µm. For example, the thickness of the porous substrate may be in the range of from 50 µm to 400 µm, or 100 µm to 300 µm, or 150 µm to 250 µm, etc.

In certain embodiments, the nanoporous layer has a thickness in the range of from 0.01 µm up to and including 10 µm. In accordance with the present disclosure, the thickness of the nanoporous layer may include, in increments of 50 nm, any range between 0.01 µm and 10 µm. For example, the thickness of the nanoporous layer may be in the range of from 50 nm to 5000 nm, or 100 nm to 3000 nm, or 500 nm to 2000 nm, etc.

In certain embodiments, the microporous layer has a thickness in the range of from 5 µm up to and including 300 µm. In accordance with the present disclosure, the thickness of the microporous layer may include, in increments of 5 µm, any range between 5 µm and 300 µm. For example, the thickness of the microporous layer may be in the range of from 5 µm to 200 µm, or 10 µm to 200 µm, or 20 µm to 100 µm, etc.

In certain embodiments, the macroporous layer has a thickness in the range of from 25 µm up to and including 500 µm. In accordance with the present disclosure, the thickness of the macroporous layer may include, in increments of 25 µm, any range between 25 µm up and 500 µm. For example, the thickness of the macroporous substrate may be in the range of from 25 µm to 300 µm, or 25 µm to 200 µm, or 50 µm to 150 µm, etc.

In certain embodiments, there may be anywhere from one to four layers in any combination within a porous substrate. The individual thickness of each layer may range from 5 nm to 1500 µm in thickness.

In certain embodiments, each layer may have a porosity that ranges from 0.5% up to and including 95%.

Pore-Filling Polymer

In general, the pore-filling polymer is insoluble in the liquids in which it comes into contact during use. More specifically, the pore-filling polymer is more permeable to a first liquid than a second liquid. In certain embodiments, the pore-filling polymer is not soluble in the first liquid, the second liquid, or a mixture thereof. As used herein, the polymer is considered to be insoluble in the first liquid (particularly, alcohol), the second liquid (particularly, gasoline), or a mixture thereof, even if insignificant amounts of the polymer are soluble in the liquids. In the context of the end use, the solubility of the pore-filling polymer is insignificant if the utility and lifetime of the composite membranes are not adversely affected.

In certain embodiments, the pore-filling polymer is in the form of a pore-filling polymer layer 26 (FIG. 1C) that forms at least a portion of the first major surface 18 of the porous substrate. In certain embodiments, the pore-filling polymer is in the form of a pore-filling polymer layer having an exposed major surface, which coats the first major surface of the porous substrate, and an opposite major surface disposed between the opposite first and second major surfaces of the porous substrate. In certain embodiments, the exposed major surface of the pore-filling polymer layer coats all the first major surface of the porous substrate.

In certain embodiments, the pore-filling polymer forms a coating on (i.e., covers) the top surface of the substrate in addition to being within the pores of the substrate. This coating layer may be 1 micron thick. This top coating layer may be continuous or discontinuous.

That is, as used herein, any reference to the pore-filling polymer layer coating or covering the first major surface of the porous substrate includes the pore-filling polymer layer coating all, substantially all, or only a portion of the first major surface of the porous substrate. The pore-filling polymer layer is considered to coat substantially all of the first major surface of the porous substrate (i.e., be substantially continuous), when enough of the first major surface of the porous substrate is coated such that the composite membrane is able to selectively pervaporate a desired amount of a first liquid (e.g., alcohol) from a mixture of the first liquid with a second liquid (e.g., gasoline).

In certain embodiments, the pore-filling polymer layer has a thickness in the range of from 10 nm up to and including 20,000 nm. More specifically, the thickness of the pore-filling polymer layer may include, in increments of 1 nm, any range between 10 nm and 20,000 nm. For example, the thickness of the pore-filling polymer layer may be in the range of from 11 nm to 5999 nm, or 20 nm to 6000 nm, or 50 nm to 5000 nm, etc.

The pore-filling polymer may be crosslinked. It may be grafted to the porous (substrate) membrane (e.g., which may be in the form of a nanoporous layer). Or, it may be crosslinked and grafted to the porous substrate (e.g., nanoporous layer).

In certain embodiments, the pore-filling polymer may swell in the presence of alcohol (e.g., ethanol) but not gasoline. When the pore-filling polymer swells in the presence of the alcohol, the resultant alcohol-swollen polymer may be referred to as a gel.

In certain embodiments, the starting materials for the pore-filling polymer include polymerizable materials such as ethylenically unsaturated monomers and/or oligomers.

In certain embodiments, the starting materials for the pore-filling polymer include (meth)acrylate-containing monomers and/or oligomers. Suitable (meth)acrylate-containing monomers and/or oligomers may be selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, and 2-acrylamido-2-methylpropanesulfonic acid (AMPS). Various combinations of such monomers and/or oligomers may be used to form the pore-filling polymer.

In certain embodiments, the (meth)acrylate-containing monomers and/or oligomers may be selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, and a polyester tetra-acrylate. Various combinations of such monomers and/or oligomers may be used to form the pore-filling polymer.

In certain embodiments, the starting monomers and/or oligomers include one or more of the following:

(a) di(meth)acryl-containing compounds such as dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, and tripropylene glycol diacrylate;

(b) tri(meth)acryl-containing compounds such as trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), and trimethylolpropane triacrylate;

(c) higher functionality (meth)acryl-containing compounds (i.e., higher than tri-functional) such as ditrimethylolpropane tetraacrylate, dipentaerythritol pentaacrylate, ethoxylated (4) pentaerythritol tetraacrylate, pentaerythritol tetraacrylate, and caprolactone modified dipentaerythritol hexaacrylate;

(d) oligomeric (meth)acryl compounds such as, for example, urethane acrylates, polyester acrylates, epoxy acrylates, silicone acrylates, polyacrylamide analogues of the foregoing, and combinations thereof (such compounds are widely available from vendors such as, for example, Sartomer Company, Exton, Pa., UCB Chemicals Corporation, Smyrna, Ga., and Aldrich Chemical Company, Milwaukee, Wis.);

(e) perfluoroalkyl meth(acryl)-containing compounds such as 1H,1H,6H,6H-perfluorohydroxyldiacrylate, 1H,1H-2,2,3,3,4,4,4-heptafluorobutyl acrylate, and perfluorocyclohexyl) methyl acrylate;

(f) charged meth(acryl)-containing compounds such as acrylic acid, 2-acrylamido-2-methylpropanefulfonic acid (AMPS), and [3-(Methacryloylamino)propyl]trimethylammonium chloride solution; and (g) polar compounds such as 2-hydroxyethyl(meth)acrylate (HEMA), N-vinyl acetamide, N-vinyl pyrrolidone, (meth)acrylamide, and glycerol methacrylate.

In certain embodiments, the pore-filling polymer is a polyethylene glycol (PEG) polymer or copolymer.

In certain embodiments, the pore-filling polymer includes a major amount of crosslinked multifunctional (meth)acrylate. For example, an asymmetric composite membrane of the present disclosure may include: a porous substrate having opposite first and second major surfaces, and a plurality of pores; and a pore-filling polymer disposed in at least some of the pores so as to form a continuous layer having a thickness, with the amount of the pore-filling polymer at, or adjacent to, the first major surface being greater than the amount of the pore-filling polymer at, or adjacent to, the second major surface, wherein the pore-filling polymer comprises a major amount of crosslinked multifunctional (meth)acrylate.

In certain embodiments, the pore-filling polymer may include additives such as polymeric additives, particulate, photoinitiators, or combinations thereof.

In some embodiments, the pore-filling polymer may include one or more polymeric additives (i.e., an additive that is a polymer and not further polymerizable). Examples of such polymeric additives include polyacrylic acid, polymethacrylic acid, polyacrylamide or its copolymers, polyethylene oxide, polyvinyl alcohol, poly(ethylene-co-vinyl alcohol) (EVAL), poly(N-vinylpyrrolidone), and combinations thereof (i.e., mixtures or copolymers thereof). The optional polymeric additive preferably has a strong affinity with the pore-filling polymer so that the latter is reinforced by the former. A polymeric additive preferably enter pores with the polymerizable starting materials thereby forming an interpenetrating polymer network. The swelling of the pore-filling polymer is believed to be further restrained by the formation of such interpenetrating polymer network (one polymer is intertwined with another polymer network on a polymeric scale). The molecular weight (weight average) of the polymeric additive typically varies from 1,000 to 500,000. The amount of polymeric additive may be at least 0.20 weight percent (wt %), or at least 1%, or at least 2.5%, based on the total amount of pore-filling polymer plus polymeric additive. The amount of polymeric additive may be up to 5 wt %, or up to 25%, or up to 75%, based on the total amount of pore-filling polymer plus polymeric additive.

In some embodiments, the pore-filling polymer may include a particulate or a plurality of particulates. Examples of suitable particulates include colloidal silica, colloidal titania, colloidal zirconia, colloidal alumina, colloidal vanadia, colloidal chromia, colloidal iron oxide, colloidal antimony oxide, colloidal tin oxide, and mixtures thereof. In certain embodiments, such particulates may have a particle size of 2 nm to 50 nm. They may be used as bridges to prevent collapse of the filled polymer and/or be selective for particular liquids (e.g., ethanol).

Other optional additives that may be included in the pore-filling polymers include photoinitiators. Exemplary photoinitiators for initiating free-radical polymerization of (meth)acrylates, for example, include benzoin and its derivatives such as alpha-methylbenzoin; alpha-phenylbenzoin; alpha-allylbenzoin; alpha-benzylbenzoin; benzoin ethers such as benzil dimethyl ketal (available, for example, under the trade designation IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available, for example, under the trade designation DAROCUR 1173 from Ciba Specialty Chemicals) and 1-hydroxycyclohexyl phenyl ketone (available, for example, under the trade designation IRGACURE 184 from Ciba Specialty Chemicals); 2-methyl-1-[4-(methylthio)phenyl]-2-(4-morpholinyl)-1-propanone (available, for example, under the trade designation IRGACURE 907 from Ciba Specialty Chemicals); 2-benzyl-2-(dimethlamino)-1-[4-(4-morpholinyl)phenyl]-I-butanone (available, for example, as IRGACURE 369 from Ciba Specialty Chemicals). Other useful photoinitiators include pivaloin ethyl ether, anisoin ethyl ether; anthraquinones, such as anthraquinone, 2-ethylanthraquinone, 1-chloroanthraquinone, 1,4-dimethyl anthraquinone, 1-methoxyanthraquinone, benzanthraquinonehalomethyltriazines; benzophenone and its derivatives; iodonium salts and sulfonium salts; titanium complexes such as bis(eta$_5$-2,4-cyclopentadien-1-yl)bis[2,6-difluoro-3-(1H-pyrrol-1-yl)phenyl]titanium (obtained under the trade designation CGI 7844-bromomethylnitrobenzene; mono- and bis-acylphosphines (available, for example, from Ciba Specialty Chemicals as IRGACURE 1700, IRGACURE 1800, IRGACURE 1850, and DAROCUR 4265).

Ionic Liquids

In certain embodiments, composite membranes of the present disclosure further include one or more ionic liquids (i.e., liquid ionic compounds) mixed with one or more pore-filling polymers.

Such composite membranes demonstrate improved performance (e.g., flux) over the same composite membranes without the ionic liquids. Improved performance may be demonstrated by increased flux while maintaining good ethanol selectivity.

An ionic liquid is a compound that is a liquid under separation conditions. It may or may not be a liquid during mixing with the pore-filling polymer, application to a substrate, storage, or shipping. In certain embodiments, the desired ionic liquid is liquid at a temperature of less than 100° C., and in certain embodiments, at room temperature.

Ionic liquids are salts in which the cation(s) and anion(s) are poorly coordinated. At least one of the ions is organic and at least one of the ions has a delocalized charge. This prevents the formation of a stable crystal lattice, and results in such materials existing as liquids at the desired temperature, often at room temperature, and at least, by definition, at less than 100° C.

In certain embodiments, the ionic liquid includes one or more cations selected from quaternary ammonium, imidazolium, pyrazolium, oxazolium, thiazolium, triazolium, pyridinium, piperidinium, pyridazinium, pyrimidinium, pyrazinium, pyrrolidinium, phosphonium, trialkylsulphonium, pyrrole, and guanidium. Combinations of compounds with different cations may be used, or compounds with combinations of different cations may be used, or both.

In certain embodiments, the ionic liquid includes one or more anions selected from $Cl^-$, $Br^-$, $I^-$, $HSO_4^-$, $NO_3^-$, $SO_4^{2-}$, $CH_3SO_3^-$, $N(SO_2CF_3)_2^-$, $CF_3SO_3^-$, $B(CN)_4^-$, $C_4F_9SO_3^-$, $PF_6^-$, $N(CN)_4^-$, $C(CN)_4^-$, $BF_4^-$, $Ac^-$, $SCN^-$, $HSO_4^-$, $CH_3SO_4^-$, $C_2H_5SO_4^-$, and $C_4H_9SO_4^-$. Combinations of compounds with different anions may be used, or compounds with combinations of different anions may be used, or both.

In certain embodiments, the ionic liquid is selected from 1-ethyl-3-methyl imidazolium tetrafluoroborate (Emim-BF$_4$), 1-ethyl-3-methyl imidazolium trifluoromethane sulfonate (Emim-TFSA), 3-methyl-N-butyl-pyridinium tetrafluoroborate, 3-methyl-N-butyl-pyridinium trifluoromethanesulfonate, N-butyl-pyridinium tetrafluoroborate, 1-butyl-2,3-dimethylimidazolium tetrafluoroborate, 1-butyl-2,3-dimethylimidazolium trifluoromethanesulfonate, 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium iodide, 1-butyl-3-methylimidazolium nitrate, 1-ethyl-3-methylimidazolium bromide, 1-ethyl-3-methylimidazolium iodide, 1-ethyl-3-methylimidazolium nitrate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium acetate, 1-butyl-3-methylimidazolium trifluoroacetate, 1-butyl-3-methyl imidazolium bis(trifluormethylsulfonyl)imide (Bmim-Tf$_2$N), and combinations thereof.

Amorphous Fluorochemical Films

In certain embodiments, composite membranes of the present disclosure further include an amorphous fluorochemical film disposed on the composite membrane. Typically, the film is disposed on the side of the composite membrane the feed mixture enters.

In certain embodiments, such composite membranes demonstrate improved durability over the same composite membranes without the amorphous fluorochemical film. Improved durability may be demonstrated by reduced mechanical damage (e.g., abrasions, scratches, or erosion, or crack generation upon membrane folding), reduced fouling, reduced chemical attack, and/or reduced performance decline after exposure to gasoline or ethanol/gasoline mixture under separation conditions.

In certain embodiments, such composite membranes demonstrate improved performance over the same composite membranes without the amorphous fluorochemical film. Improved performance may be demonstrated by increased flux.

In certain embodiments, such amorphous fluorochemical film typically has a thickness of at least 0.001 µm, or at least 0.03 µm. In certain embodiments, such amorphous fluorochemical film typically has a thickness of up to and including 5 µm, or up to and including 0.1 µm.

In certain embodiments, the amorphous fluorochemical film is a plasma-deposited fluorochemical film, as described in U.S. Pat. Pub. 2003/0134515.

In certain embodiments, the plasma-deposited fluorochemical film is derived from one or more fluorinated compounds selected from: linear, branched, or cyclic saturated perfluorocarbons; linear, branched, or cyclic unsaturated perfluorocarbons; linear, branched, or cyclic saturated partially fluorinated hydrocarbons; linear, branched, or cyclic unsaturated partially fluorinated hydrocarbons; carbonylfluorides; perfluorohypofluorides; perfluoroether compounds; oxygen-containing fluorides; halogen fluorides; sulfur-containing fluorides; nitrogen-containing fluorides; silicon-containing fluorides; inorganic fluorides (such as aluminum fluoride and copper fluoride); and rare gas-containing fluorides (such as xenon difluoride, xenon tetrafluoride, and krypton hexafluoride).

In certain embodiments, the plasma-deposited fluorochemical film is derived from one or more fluorinated compounds selected from $CF_4$, $SF_6$, $C_2F_6$, $C_3F_8$, $C_4F_{10}$, $C_5F_{12}$, $C_6F_{14}$, $C_7F_{16}$, $C_8F_{18}$, $C_2F_4$, $C_3F_6$, $C_4F_8$, $C_5F_{10}$, $C_6F_{12}$, $C_4F_6$, $C_7F_{14}$, $C_8F_{16}$, $CF_3COF$, $CF_2(COF)_2$, $C_3F_7COF$, $CF_3OF$, $C_2F_5OF$, $CF_3COOF$, $CF_3OCF_3$, $C_2F_5OC_2F_5$, $C_2F_4OC_2F_4$, $OF_2$, $SOF_2$, $SOF_4$, $NOF$, $ClF_3$, $IF_5$, $BrF_5$, $BrF_3$, $CF_3I$, $C_2F_5I$, $N_2F_4$, $NF_3$, $NOF_3$, $SiF_4$, $SiF_4$, $Si_2F_6$, $XeF_2$, $XeF_4$, $KrF_2$, $SF_4$, $SF_6$, monofluorobenzene, 1,2-difluorobenzene, 1,2,4-trifluorobenzene, pentafluorobenzene, pentafluoropyridine, and pentafluorotolenene.

In certain embodiments, the plasma-deposited fluorochemical film is derived from one or more hydrocarbon compounds in combination with one or more fluorinated compounds. Examples of suitable hydrocarbon compounds include acetylene, methane, butadiene, benzene, methylcyclopentadiene, pentadiene, styrene, naphthalene, and azulene.

Typically, fluorocarbon film plasma deposition occurs at rates ranging from 1 nanometer per second (nm/sec) to 100 nm/sec depending on processing conditions such as pressure, power, gas concentrations, types of gases, and the relative size of the electrodes. In general, deposition rates increase with increasing power, pressure, and gas concentration. Plasma is typically generated with RF electric power levels of at least 500 watts and often up to and including 8000 watts, with a typical moving web speed or at least 0.3 meter per minute (m/min) and often up to and including 90 m/min. The gas flow rates, e.g., of the fluorinated compound and the optional hydrocarbon compound, is typically at least 10 (standard cubic centimeters per minutes) sccm and often up to and including 5000 sccm. In some embodiments, the fluorinated compound is carried by an inert gas such as argon, nitrogen, helium, etc.

In certain embodiments, the amorphous fluorochemical film includes an amorphous glassy perfluoropolymer having a Tg (glass transition temperature) of at least 100° C.

Examples of suitable amorphous glassy perfluoropolymers include a copolymer of perfluoro-2,2-dimethyl-1,3-dioxole (PDD) and polytetrafluoroethylene (TFE) (such as those copolymers available under the trade names TEFLON AF2400 and TEFLON AF1600 from DuPont Company), a copolymer of 2,2,4-trifluoro-5-trifluoromethoxy-1,3-dioxole (TTD) and TFE (such as those copolymers available under the trade names HYFLON AD60 and HYFLON AD80 from Solvay Company), and a copolymer of TFE and cyclic perfluoro-butenylvinyl ether (such as the copolymer available under the trade name CYTOP from Asahi Glass, Japan).

In certain embodiments, such amorphous glassy perfluoropolymer is a perfluoro-dioxole homopolymer or copolymer such as a copolymer of perfluoro-2,2-dimethyl-1,3-dioxole (PDD) and polytetrafluoroethylene (TFE), and a copolymer of 2,2,4-trifluoro-5-trifluoromethoxy-1,3-dioxole (TTD) and TFE.

In certain embodiments, such amorphous glassy perfluoropolymer is deposited out of solution. Exemplary solvents for use in deposition of the amorphous glassy perfluoropolymer include those available from 3M Company under the trade names FLUORINERT FC-87, FC-72, FC-84, and FC-770, as well as NOVEC HFE-7000, HFE-7100, HFE-7200, HFE-7300, and HFE-7500.

Methods of Making Composite Membranes

Well-known techniques may be used to make the asymmetric composite membranes of the present disclosure.

Typically, a curable pore-filling polymer composition (i.e., "pore-filling polymer coating solution" or simply "pore-filling coating solution") may be prepared by one or more monomers and/or oligomers with optional additives in a suitable amount of a liquid (e.g., deionized water or organic solvents). If an organic solvent is used may include dibutyl sebecate, glycerol triacetate, methanol, ethanol, propanol, isopropanol, etc. Preferably, it is a volatile organic solvent for easy solution saturation or diffusion into the pores.

The pore-filling coating solution may be applied to a selected porous substrate by a variety of techniques such as dip coating, gravure coating, die coating, slot coating, etc. Monomer and/or oligomer concentration may range from 0.5% to 100%. Monomer with polar groups or charged groups such as 2-acrylamido-2-methylpropanesulfonic acid (AMPS) may be added into the coating solution to increase ethanol selectivity.

For example, a porous substrate may be saturated in a pore-filling coating solution of monomers and/or oligomers of a pore-filling polymer (e.g., a polyethylene glycol diacrylate, etc.) in deionized water. Typically, the substrate may be separated from the liquid (e.g., volatile organic solvent) before or after irradiation. Preferably, upon removal from the solution, the substrate may be exposed to irradiation, such as UV irradiation. This can be done for example, on a moving belt. Any uncured pore-filling coating solution may be washed away, and then the composite membrane dried.

Either an ionic liquid can be mixed in the coating composition and applied to the porous support at one pass, or an ionic liquid dissolved in a solvent can be over-coated onto the polymeric ionomer coated membrane. The ionic liquid may diffuse into the polymeric ionomer layer.

An amorphous fluorocarbon film may be applied after the polymeric ionomer composition is coated in or on a substrate. The fluorocarbon film can be formed out of a solution or deposited by plasma fluorination.

Commercially available porous substrates may be supplied with a humectant, such as glycerol, that fills and/or coats the pores of the substrate. Typically, this is done to prevent small pores from collapsing during drying process and storage, for example. This humectant may or may not be washed out before using. Typically, however, the humectant is washed out by the process of filling the pores with the pore-filling coating solution. Preferably, a substrate is obtained and used without a humectant.

Suitable methods for preparing preferred asymmetric composite membranes of the present disclosure are described in International Publication No. WO 2010/002501 (Zhou et al.).

Uses

Composite membranes, particularly asymmetric composite membranes, of the present disclosure may be used in various separation methods. Such separation methods include pervaporation, vapor permeation, gas separation, nanofiltration, organic solvent nanofiltration, and combinations thereof (e.g., a combination of pervaporation and vapor permeation). The composite membranes, particularly the asymmetric composite membranes, of the present disclosure are particularly useful in pervaporation methods. Pervaporation may be used for desulfurization of gasoline, dehydration of organic solvents, isolation of aroma components, and removal of volatile organic compounds from aqueous solutions.

Preferred methods of the present disclosure involve use of the composite membranes, particularly the asymmetric composite membranes, in pervaporation, particularly pervaporating alcohol from an alcohol and gasoline mixture.

Well-known separation techniques may be used with the composite membranes of the present disclosure. For example, nanofiltration techniques are described in U.S. Pat. Pub. No. 2013/0118983 (Linvingston et al.), U.S. Pat. No. 7,247,370 (Childs et al.), and U.S. Pat. Pub. No. 2002/0161066 (Remigy et al.). Pervaporation techniques are described in U.S. Pat. No. 7,604,746 (Childs et al.) and EP 0811420 (Apostel et al.). Gas separation techniques are described in *Journal of Membrane Sciences*, vol. 186, pages 97-107 (2001).

Pervaporation separation rate is typically not constant during a depletion separation. The pervaporation rate is higher when the feed concentration of the selected material (in this case ethanol) is higher than near then end of the separation when the feed concentration of the selected material is lower and this rate is typically not linear with concentration. At high feed concentration the separation rate is high and the feed concentration of the selected material and flux falls rapidly, but this concentration and flux changes very slowly as the limit of depletion is reached.

Typical conditions used in separation methods of the present disclosure include fuel temperatures of from −20° C. (or from 20° C. or from room temperature) up to and including 120° C. (or up to and including 95° C.), fuel pressures of from 10 pounds per square inch (psi) (69 kPa) up to and including 400 psi (2.76 MPa) (or up to and including 100 psi (690 kPa)), fuel flow rates of 0.1 liter per minute (L/min) up to and including 20 L/min, and vacuum pressures of from 20 Torr (2.67 kPa) up to and including ambient pressure (i.e., 760 Torr (101 kPa)).

The performance of a composite membrane is mainly determined by the properties of the pore-filling polymer anchored within the pores of the porous (support) membrane.

The efficiency of a pervaporation membrane may be expressed as a function of its selectivity and of its specific flux. The selectivity is normally given as the ratio of the concentration of the better permeating component to the concentration of the poorer permeating component in the permeate, divided by the corresponding concentration ratio in the feed mixture to be separated:

$$\alpha = (y_w/y_i)/(x_w/x_i)$$

wherein $y_w$ and $y_i$ are the content of each component in the permeate, and $x_w$ and $x_i$ are the content of each component in the feed, respectively. Sometimes, the permeate concentration is defined as the separation efficiency if the feed component is relatively consistent.

The trans-membrane flux is a function of the composition of the feed. It is usually given as permeate amount per membrane area and per unit time, e.g., kilogram per meter squared per hour ($kg/m^2/hr$).

In certain embodiments of the present disclosure, the pore-filling polymer exhibits an alcohol selectivity in the range of from at least 30% up to and including 100%. In this context, "alcohol selectivity" means the amount of alcohol in the gasoline/alcohol mixture that diffuses through to the output side of the asymmetric composite membrane. In accordance with the present disclosure, the alcohol selectivity of the pore-filling polymer may include, in increments of 1%, any range between 30% and 100%. For example, the alcohol selectivity may be in the range of from 31% up to 99%, or 40% to 100%, or 50% to 95%, etc.

In certain embodiments, the pore-filling polymer in the composite membrane exhibits an average alcohol permeate flux (e.g., from an alcohol/gasoline mixture) in the range of from at least 0.3 $kg/m^2/hr$, and in increments of 10 $g/m^2/hr$, up to and including 30 $kg/m^2/hr$. The average ethanol flux from E10 (10% ethanol) to E2 (2% ethanol) standard include in the range of from 0.2 $kg/m^2/hr$ to 20 $kg/m^2/hr$. Preferred processing conditions used for such flux measurement include: a feed temperature of from −20° C. (or from 20° C.) up to and including 120° C. (or up to and including 95° C.), a permeate vacuum pressure of from 20 Torr (2.67 kPa) up to and including 760 Torr (101 kPa), a feed pressure of from 10 psi (69 kPa) up to and including 400 psi (2.76 MPa) (or up to and including 100 psi (690 kPa)), and an ethanol concentration in feed gasoline of from 2% up to and including 20%.

In certain embodiments of the present disclosure, the pore-filling polymer in the composite membrane can exhibit an average ethanol permeate flux, in increments of 10 $g/m^2/hour$, between the below-listed upper and lower limits (according to Method 1 and/or Method 2 in the Examples Section). In certain embodiments, the average ethanol permeate flux may be at least 310 $g/m^2/hour$, or at least 350 $g/m^2/hour$, or at least 500 $g/m^2/hour$. In certain embodiments, the average permeate flux may be up to 30 $kg/m^2/hour$, or up to 20 $kg/m^2/hour$, or up to 10 $kg/m^2/hour$. For example, the average permeate flux may be in the range of from 310 $g/m^2/hour$ up to 20 $kg/m^2/hour$, or 350 $g/m^2/hour$ up to 30 $kg/m^2/hour$, or 500 $g/m^2/hour$ up to 10 $kg/m^2/hour$, etc. It may be desirable for the pore-filling polymer to exhibit an average permeate flux of 320 $g/m^2/hour$, when the asymmetric composite membrane is assembled into 0.3 to 5 liter volume cartridge such that the cartridge will produce the desired amount of flux to meet the system requirements. The system requirements are defined by internal combustion engines that require ethanol flux. One example is a Japan Society of Automotive Engineers technical paper JSAE 20135048 titled "Research Engine System Making Effective Use of Bio-ethanol-blended Fuels."

Preferred processing conditions used for such flux measurement include: a feed temperature of from −20° C. (or from 20° C.) up to and including 120° C. (or up to and including 95° C.), a permeate vacuum pressure of from 20 Torr (2.67 kPa) up to and including 760 Torr (101 kPa), a feed pressure of from 69 kPa up to and including 2.76 MPa (or up to and including 690 kPa), and an ethanol concentration in feed gasoline of from 2% up to and including 20%.

Composite membranes of the present disclosure may be incorporated into cartridges (i.e., modules), in particular cartridges for separating alcohol from an alcohol and gasoline mixture. Suitable cartridges include, for example, spiral-wound modules, plate and frame modules, tubular modules, hollow fiber modules, pleated cartridge, and the like.

Figure 2:
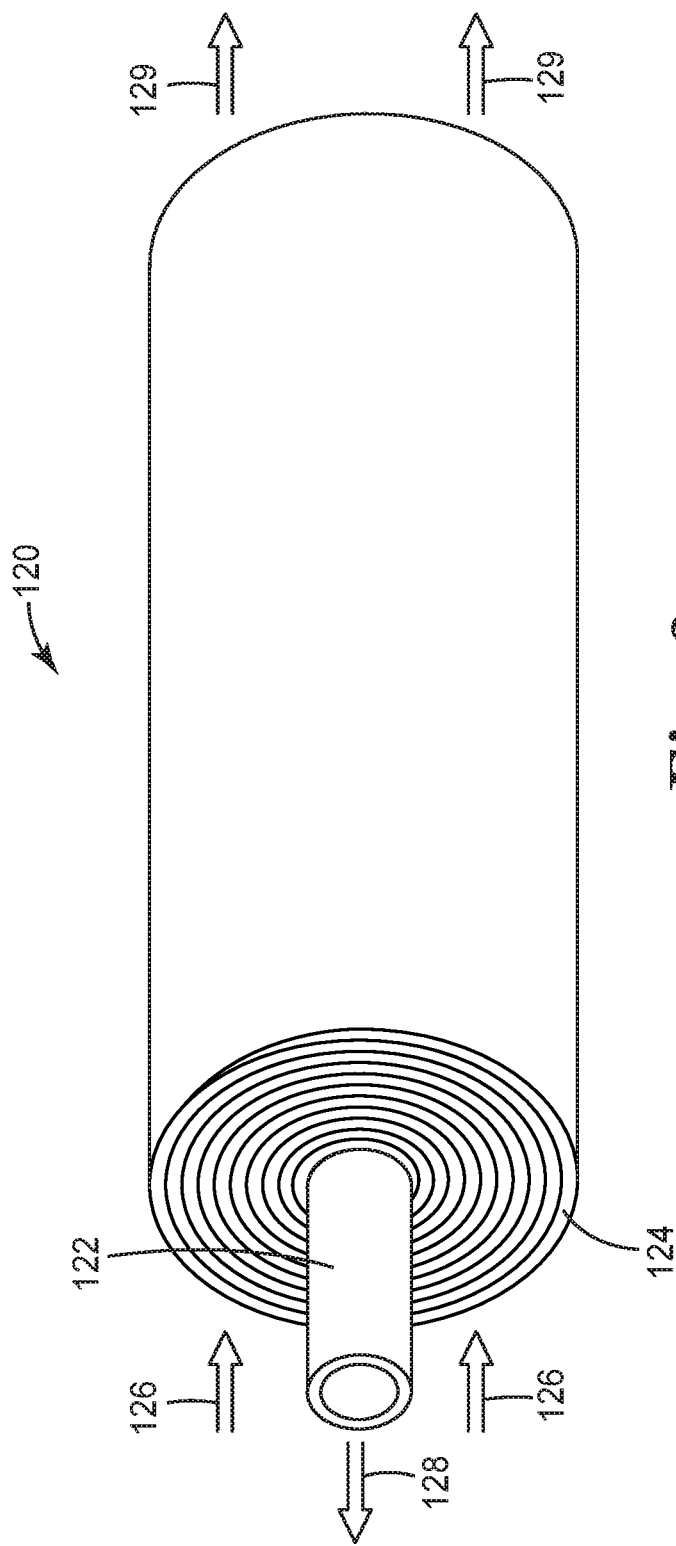
FIG. 2 is a perspective side view of a module that includes an exemplary composite membrane of the present disclosure.

FIG. 2 is an illustration of an exemplary module 120 (specifically, a spiral-wound module) that includes a support tube 122, an exemplary composite membrane 124 of the present disclosure wound onto the support tube 122. During use, a mixture of liquids to be separated (e.g., alcohol and gasoline mixture) enters the module 120 and flows along the direction of arrows 126 into the composite membrane 124. As the mixture flows past the composite membrane layers, the liquid that is less permeable in the pore-filling polymer (e.g., gasoline) is not absorbed by the pore-filling polymer, while the more permeable liquid (e.g., alcohol) is absorbed in and passes through the pore-filling polymer and then flows out of the center of the support tube 122 along the direction of arrow 128. For example, a high concentration of alcohol (typically with a small amount of gasoline), which is separated from an alcohol/gasoline mixture, flows out of the center of the support tube 122 as vapor and/or liquid along the direction of arrow 128, and the resultant mixture with a lower concentration of alcohol than present in the mixture that enters the composite membrane flows out of the composite membrane along the direction of arrows 129.

Figure 3:
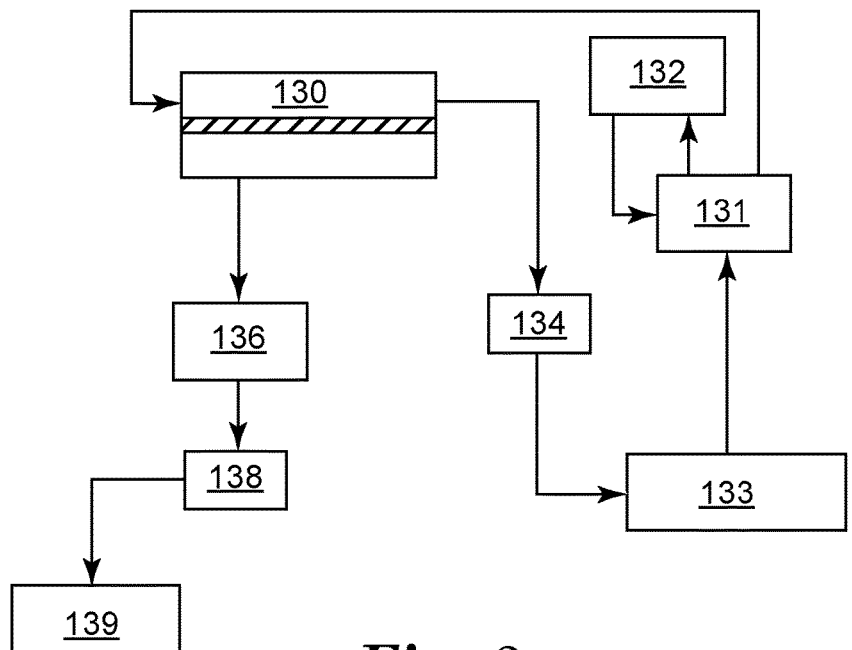
FIG. 3 is an illustration of an exemplary fuel separation system that includes an exemplary composite membrane of the present disclosure.

In certain embodiments, an exemplary cartridge has a volume in the range of from 200 milliliters (mL), or 500 mL, up to and including 5.000 liters (L). In accordance with the present disclosure, the volume of the cartridge may include, in increments of 10 mL, any range between 200 mL, or 500 mL, and 5.000 L. For example, the cartridge volume may be in the range of from 210 mL up to 4.990 L, or 510 mL up to 4.990 L, or 300 mL up to 5.000 L, or 600 mL up to 5.000 L, or 1.000 L up to 3.000 L, etc. In certain embodiments, the cartridge has a volume of 1.000 L. In certain embodiments, the cartridge has a volume of 0.800 L Cartridges that include composite membranes (e.g., asymmetric composite membranes) of the present disclosure may be incorporated into fuel separation systems, which may be used in, or in conjunction with, engines such as flex-fuel engines. An exemplary fuel separation system is shown in FIG. 3, which employs a membrane pervaporation method (PV method) to separate high ethanol fraction gasoline from gasoline containing ethanol. Typically, gasoline is introduced into an inlet of a membrane separation unit 130 after being passed through a heat exchanger 131 (which is connected to engine coolant 132) from a main fuel storage tank 133. A low-ethanol fraction fuel from the membrane separation unit 130 is returned to the main fuel storage tank 133 after being cooled as it passes through a radiator 134. The ethanol rich vapor which came out of membrane separation unit 130 is typically passed through a condenser 136 where it is condensed under negative pressure produced by vacuum pump 138 and then collected in an ethanol tank 139.

In certain embodiments, a fuel separation system includes one or more cartridges, which may be in series or parallel, which include composite membranes of the present disclosure.

Exemplary Embodiments

Embodiment 1 is a composite membrane for selectively separating (e.g., pervaporating) a first fluid (e.g., first liquid) from a feed mixture comprising the first fluid (e.g., first liquid) and a second fluid (e.g., second liquid), the composite membrane comprising: a porous substrate comprising opposite first and second major surfaces, and a plurality of pores; and a pore-filling polymer disposed in at least some of the pores so as to form a layer having a thickness within the porous substrate; wherein the pore-filling polymer is more permeable to the first fluid (e.g., first liquid) than the second fluid (e.g., second liquid); wherein the composite membrane further comprises at least one of:

(a) an ionic liquid mixed with the pore-filling polymer; or
(b) an amorphous fluorochemical film disposed on the composite membrane Embodiment 2 is the composite membrane further comprises an amorphous fluorochemical film disposed on the composite membrane.

Embodiment 3 is the composite membrane according to embodiment 2 wherein the amorphous fluorochemical film has a thickness of 0.001 μm to 5 μm (and in some embodiments 0.03 μm to 0.1 μm).

Embodiment 4 is the composite membrane according to embodiment 2 or 3 wherein the amorphous fluorochemical film is a plasma-deposited fluorochemical film.

Embodiment 5 is the composite membrane according to embodiment 4 wherein the plasma-deposited fluorochemical film is derived from one or more fluorinated compounds selected from:
linear, branched, or cyclic saturated perfluorocarbons;
linear, branched, or cyclic unsaturated perfluorocarbons;
linear, branched, or cyclic saturated partially fluorinated hydrocarbons;
linear, branched, or cyclic unsaturated partially fluorinated hydrocarbons;
carbonylfluorides;
perfluorohypofluorides;
perfluoroether compounds;
oxygen-containing fluorides;
halogen fluorides;
sulfur-containing fluorides;
nitrogen-containing fluorides;
silicon-containing fluorides;
inorganic fluorides (such as aluminum fluoride and copper fluoridd); and
rare gas-containing fluorides (such as xenon difluoride, xenon tetrafluoride, and krypton hexafluoride).

Embodiment 6 is the composite membrane according to embodiment 5 wherein the plasma-deposited fluorochemical film is derived from one or more fluorinated compounds selected from $CF_4$, $SF_6$, $C_2F_6$, $C_3F_8$, $C_4F_{10}$, $C_5F_{12}$, $C_6F_{14}$, $C_7F_{16}$, $C_8F_{18}$, $C_2F_4$, $C_3F_6$, $C_4F_8$, $C_5F_{10}$, $C_6F_{12}$, $C_4F_6$, $C_7F_{14}$, $C_8F_{16}$, $CF_3COF$, $CF_2(COF)_2$, $C_3F_7COF$, $CF_3OF$, $C_2F_5OF$, $CF_3COOF$, $CF_3OCF_3$, $C_2F_5OC_2F_5$, $C_2F_4OC_2F_4$, $OF_2$, $SOF_2$, $SOF_4$, $NOF$, $ClF_3$, $IF_5$, $BrF_5$, $BrF_3$, $CF_3I$, $C_2F_5I$, $N_2F_4$, $NF_3$, $NOF_3$, $SiF_4$, $SiF_4$, $Si_2F_6$, $XeF_2$, $XeF_4$, $KrF_2$, $SF_4$, $SF_6$, monofluorobenzene, 1,2-difluorobenzene, 1,2,4-trifluorobenzene, pentafluorobenzene, pentafluoropyridine, and pentafluorotolenene.

Embodiment 7 is the composite membrane according to any one of embodiments 2 through 6 wherein the plasma-deposited fluorochemical film is derived from one or more hydrocarbon compounds in combination with one or more fluorinated compounds.

Embodiment 8 is the composite membrane according to embodiment 7 wherein the hydrocarbon compound is selected from acetylene, methane, butadiene, benzene, methylcyclopentadiene, pentadiene, styrene, naphthalene, and azulene.

Embodiment 9 is the composite membrane according to embodiment 2 or 3 wherein the amorphous fluorochemical film comprises an amorphous glassy perfluoropolymer having a Tg of at least 100° C.

Embodiment 10 is the composite membrane according to embodiment 9 wherein the amorphous glassy perfluoropolymer comprises a copolymer of perfluoro-2,2-dimethyl-1,3-dioxole (PDD) and TFE, a copolymer of 2,2,4-trifluoro-5-trifluoromethyoxy-1,3-dioxole (TTD) and TFE, or a copolymer of TFE and cyclic perfluoro-butenylvinyl ether.

Embodiment 11 is the composite membrane according to embodiment 9 or 10 wherein the amorphous glassy perfluoropolymer is deposited out of solution.

Embodiment 12 is the composite membrane according to embodiment 1 further comprises an ionid liquid mixed with the pore-filling polymer.

Embodiment 13 is the composite membrane according to embodiment 12 wherein the
ionic liquid comprises a cation selected from imidazolium, pyrazolium, oxazolium, thiazolium, triazolium, pyridinium, pyridazinium, pyrimidinium, pyrazinium, and combinations thereof.

Embodiment 14 is the composite membrane according to embodiment 12 or 13 wherein the ionic liquid comprises an anion selected from Cl$^-$, Br$^-$, I$^-$, HSO$_4^-$, NO$_3^-$, SO$_4^{2-}$, CH$_3$SO$_3^-$, N(SO$_2$CF$_3$)$_2^-$, CF$_3$SO$_3^-$, B(CN)$_4^-$, C$_4$F$_9$SO$_3^-$, PF$_6^-$, N(CN)$_4^-$, C(CN)$_4^-$, BF$_4^-$, Ac$^-$, SCN$^-$, HSO$_4^-$, CH$_3$SO$_4^-$, C$_2$H$_5$SO$_4^-$, C$_4$H$_9$SO$_4^-$, and combinations thereof.

Embodiment 15 is the composite membrane according to any one of embodiments 12 through 14 wherein the ionic liquid is selected from 1-ethyl-3-methyl imidazolium tetrafluoroborate (Emim-BF$_4$), 1-ethyl-3-methyl imidazolium trifluoromethane sulfonate (Emim-TFSA), 3-methyl-N-butyl-pyridinium tetrafluoroborate, 3-methyl-N-butyl-pyridinium trifluoromethanesulfonate, N-butyl-pyridinium tetrafluoroborate, 1-butyl-2,3-dimethylimidazolium tetrafluoroborate, 1-butyl-2,3-dimethylimidazolium trifluoromethanesulfonate, 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium iodide, 1-butyl-3-methylimidazolium nitrate, 1-ethyl-3-methylimidazolium bromide, 1-ethyl-3-methylimidazolium iodide, 1-ethyl-3-methylimidazolium nitrate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium acetate, 1-butyl-3-methylimidazolium trifluoroacetate, 1-butyl-3-methyl imidazolium bis(trifluormethylsulfonyl)imide (Bmim-Tf$_2$N), and combinations thereof.

Embodiment 16 is the composite membrane according to any one of embodiments 1 through 15 which is an asymmetric composite membrane, wherein the amount of the pore-filling polymer at, or adjacent to, the first major surface is greater than the amount of the pore-filling polymer at, or adjacent to, the second major surface.

Embodiment 17 is the composite membrane according to any one of embodiments 1 through 16 wherein the first fluid (e.g., first liquid) is an alcohol.

Embodiment 18 is the composite membrane according to any one of embodiments 1 through 17 wherein the second fluid (e.g., second liquid) is gasoline, an aromatic or aliphatic hydrocarbon, or an ether.

Embodiment 19 is the composite membrane according to any one of embodiments 1 through 18 wherein the first fluid (e.g., first liquid) is an alcohol, and the second fluid (e.g., second liquid) is gasoline.

Embodiment 20 is the composite membrane according to any one of embodiments 1 through 19 wherein the pore-filling polymer layer is a continuous layer.

Embodiment 21 is the composite membrane according to any one of embodiments 1 through 20 which is an asymmetric composite membrane for selectively pervaporating alcohol from an alcohol and gasoline mixture, wherein the asymmetric composite membrane comprises: a porous substrate comprising opposite first and second major surfaces, and a plurality of pores; and a pore-filling polymer disposed in at least some of the pores so as to form a layer having a thickness within the porous substrate, with the amount of the pore-filling polymer at, or adjacent to, the first major surface being greater than the amount of the pore-filling polymer at, or adjacent to, the second major surface; wherein the pore-filling polymer is more permeable to alcohol than gasoline.

Embodiment 22 is the asymmetric composite membrane according to embodiment 21 wherein the pore-filling polymer layer is a continuous layer.

Embodiment 23 is the composite membrane according to any one of embodiments 1 through 22 wherein the porous substrate is a polymeric porous substrate.

Embodiment 24 is the composite membrane according to any one of embodiments 1 through 23 wherein the porous substrate is asymmetric or symmetric (e.g., with respect to pore sizes throughout the thickness of the substrate).

Embodiment 25 is the composite membrane according to any one of embodiments 1 through 24 wherein the porous substrate comprises a nanoporous layer.

Embodiment 26 is the composite membrane according to embodiment 25 wherein the nanoporous layer is adjacent to or defines the first major surface of the porous substrate.

Embodiment 27 is the composite membrane according to any one of embodiments 1 through 26 wherein the porous substrate comprises a microporous layer.

Embodiment 28 is the composite membrane according to embodiment 27 wherein the microporous layer is adjacent to or defines the second major surface of the porous substrate.

Embodiment 29 is the composite membrane according to any one of embodiments 1 through 28 wherein the porous substrate comprises a macroporous layer.

Embodiment 30 is the composite membrane according to embodiment 29 wherein the macroporous layer is adjacent to or defines the second major surface of the porous substrate.

Embodiment 31 is the composite membrane according to any one of embodiments 1 through 30 wherein the porous substrate has a thickness measured from one to the other of the opposite major surfaces in the range of from 5 μm up to and including 500 μm.

Embodiment 32 is the composite membrane according to embodiment 25 or 26 wherein the nanoporous layer has a thickness in the range of from 0.01 μm up to and including 10 μm.

Embodiment 33 is the composite membrane according to embodiment 27 or 28 wherein the microporous layer has a thickness in the range of from 5 μm up to and including 300 μm.

Embodiment 34 is the composite membrane according to embodiment 29 or 30 wherein the macroporous layer has a thickness in the range of from 25 μm up to and including 500 μm.

Embodiment 35 is the composite membrane according to any one of embodiments 1 through 34 wherein the porous substrate comprises pores having an average size in the range of from 0.5 nanometer (nm) up to and including 1000 μm.

Embodiment 36 is the composite membrane according to any one of embodiments 25, 26, and 32, wherein the nanoporous layer comprises pores having a size in the range of from 0.5 nanometer (nm) up to and including 100 nm.

Embodiment 37 is the composite membrane according to any one of embodiments 27, 28, and 33, wherein the microporous layer comprises pores having a size in the range of from 0.01 μm up to and including 20 μm.

Embodiment 38 is the composite membrane according to any one of embodiments 29, 30, and 34, wherein the macroporous layer comprises pores having a size in the range of from 1 μm up to and including 1000 μm.

Embodiment 39 is the composite membrane according to any one of embodiments 1 through 38 wherein the pore-filling polymer is crosslinked, grafted to the porous substrate, or both.

Embodiment 40 is the composite membrane according to any one of embodiments 1 through 39 wherein the pore-filling polymer is crosslinked and/or grafted to a nanoporous substrate.

Embodiment 41 is the composite membrane according to any one of embodiments 1 through 40 wherein the starting materials for the pore-filling polymer comprise ethylenically unsaturated monomers and/or oligomers.

Embodiment 42 is the composite membrane according to embodiment 41 wherein the starting materials for the pore-filling polymer comprise (meth)acrylate-containing monomers and/or oligomers.

Embodiment 43 is the composite membrane according embodiment 42 wherein the (meth)acrylate-containing monomers and/or oligomers are selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, 2-acrylamido-2-methylpropanefulfonic acid (AMPS), and combinations of such monomers and/or oligomers.

Embodiment 44 is the composite membrane of embodiment 43 wherein the (meth)acrylate-containing monomers and/or oligomers are selected from the group of a polyethylene glycol (meth)acrylate, a polyethylene glycol di(meth) acrylate, a silicone diacrylate, a silicone hexa-acrylate, a polypropylene glycol di(meth)acrylate, an ethoxylated trimethylolpropane triacrylate, a hydroxylmethacrylate, 1H,1H, 6H,6H-perfluorohydroxyldiacrylate, a polyester tetra-acrylate, and combinations of such monomers and/or oligomers.

Embodiment 45 is the composite membrane according to any one of embodiments 1 through 44 wherein the pore-filling polymer swells in the presence of alcohol but not gasoline.

Embodiment 46 is the composite membrane according to any one of embodiments 1 through 45 wherein the pore-filling polymer is in the form of a pore-filling polymer layer that forms at least a portion of the first major surface of the porous substrate.

Embodiment 47 is the composite membrane according to any one of embodiments 1 through 46 wherein the pore-filling polymer is in the form of a pore-filling polymer layer having an exposed major surface, which coats the first major surface of the porous substrate, and an opposite major surface disposed between the opposite first and second major surfaces of the porous substrate.

Embodiment 48 is the composite membrane according to embodiment 47 wherein the exposed major surface of the pore-filling polymer layer coats all the first major surface of the porous substrate.

Embodiment 49 is the composite membrane according to any one of embodiments 1 through 48 wherein the pore-filling polymer layer has a thickness in the range of from 10 nm up to and including 20,000 nm.

Embodiment 50 is the composite membrane according to any one of embodiments 1 through 49 wherein the pore-filling polymer exhibits an alcohol selectivity in the range of from at least 30% up to and including 100%.

Embodiment 51 is the composite membrane according to any one of embodiments 1 through 50 wherein the pore-filling polymer exhibits an average alcohol permeate (e.g., alcohol from an alcohol/gasoline mixture) flux in the range of from at least 310 g/m$^2$/hour up to and including 30 kg/m$^2$/hour, using a feed temperature in the range of from at least −20° C. up to and including 120° C., a permeate vacuum pressure in the range of from at least 20 Torr (2.67 kPa) up to and including 760 Torr (101 kPa), a feed pressure in the range of at least 10 psi (69 kPa) up to and including 2.76 MPa, and an alcohol concentration in feed gasoline/alcohol mixture in the range of from at least 2% up to and including 20%.

Embodiment 52 is a cartridge for separating alcohol from an alcohol and gasoline mixture, the cartridge comprising an asymmetric composite membrane according to any one of embodiments 1 through 51.

Embodiment 53 is the cartridge according to embodiment 52 having a volume in the range of from 200 milliliters (mL), or from 500 mL, up to and including 5.000 liters (L).

Embodiment 54 is a fuel separation system comprising one or more cartridges (which may be in series of parallel) according to embodiment 52 or 53.

Embodiment 55 is a method of separating a first liquid from a mixture of the first liquid and a second liquid, the method comprising contacting the mixture with an asymmetric composite membrane according to any one of embodiments 1 through 51.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

IRGACURE 2959, 1-[4-(2-Hydroxyethoxy)-phenyl]-2-hydroxy-2-methyl-1-propane-1-one, obtained from BASF Corp., Florham Park, N.J.

EBECRYL 350, EB350, silicone diacrylate, obtained from Cytec Industries, Smyrna, Ga. FHDA, 1H,1H,6H,6H-perflourohexyldiacrylate, obtained from Oakwood Products, West Columbia, S.C.

GTA, glycerol triacetate, obtained from Univar USA, Redmond, Wash.

HEMA, 2-hydroxyl methacrylate, obtained from Alfa Aesar, Ward Hill, Mass.

PEGMMA, polyethylene glycol methylether methacrylate, Mn~2080, obtained from Sigma Aldrich, Milwaukee, Wis.

PPG900DA, polypropylene glycol 900 diacrylate, obtained from Sigma Aldrich, Milwaukee, Wis.

CD552, methoxy polyethylene glycol 550 monoacrylate, obtained from Sartomer, Exton, Pa.

CD553, methoxy polyethylene glycol 550 monoacrylate, obtained from Sartomer, Exton, Pa.

CN2622, polyester acrylate, obtained from Sartomer Co., Exton, Pa.

SR259, polyethylene glycol 200 diacrylate obtained from Sartomer, Exton, Pa.

SR344, polyethyleneglycol 400 diacrylate, obtained from Sartomer Company, Exton, Pa.

SR415, ethoxylated trimethylolpropane triacrylate, obtained from Sartomer, Exton, Pa.

SR454, ethoxylated 3-trimethylolpropane triacrylate, obtained from Sartomer, Exton, Pa.

SR603, polyethyleneglycol 400 dimethacrylate, Sartomer Company, Exton, Pa.

SR610, polyethyleneglycol 600 diacrylate, Sartomer Company, Exton, Pa.

TMPTA, trimethylolpropane triacrylate, obtained from Alfa Aesar, Ward Hill, Mass.

BLA020, micro porous nylon substrate, obtained from 3M Purification Inc., Meriden, Conn.

PA450, polyacrylonitrile substrate, obtained from Nanostone Water, formerly known as Sepro Membranes Inc., Oceanside, Calif.

PE2, polyethersulfone substrate, obtained from Nanostone Water, formerly known as Sepro Membranes Inc., Oceanside, Calif.

PE5, polyethersulfone substrate, obtained from Nanostone Water, formerly known as Sepro Membranes Inc., Oceanside, Calif.

PE900 C/D, polyethersulfone substrate, obtained from Nanostone Water, formerly known as Sepro Membranes Inc., Oceanside, Calif.

AMPS, 2.5 wt % 2-acrylamido-2-methylpropanesulfonic acid, obtained from Sigma Aldrich, Milwaukee, Wis.

APS, titanium (IV) oxide powder 32 nanometer particle size, obtained from Alfa Aesar, MA BIS, N,N'-methylenebisacrylamide, obtained from Alfa Aesar, Ward Hill, Mass.

DBS, dibutyl sebacate, obtained from Vertellus Performance Materials, Inc., Greensboro, N.C.

NaCl, EM Science, Gibbstown, N.J.

Nalco 2326, ammonia stabilized colloidal silica, 14.5% colloidal silica as $SiO_2$; particle size 5 nm; obtained from Nalco Chemical Company, Naperville, Ill.

Polyacrylic acid, 50% aqueous solution, MW 5000, Alfa Aesar, Ward Hill, Mass.

Test Procedures

Method 1

Figure 4:
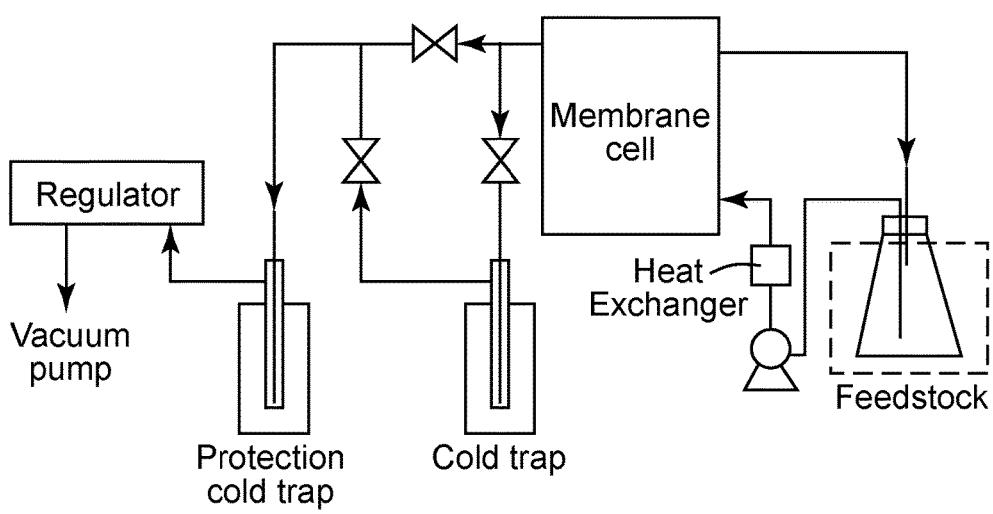
FIG. 4 is an illustration of a vacuum pervaporation testing apparatus.
Figure 5:
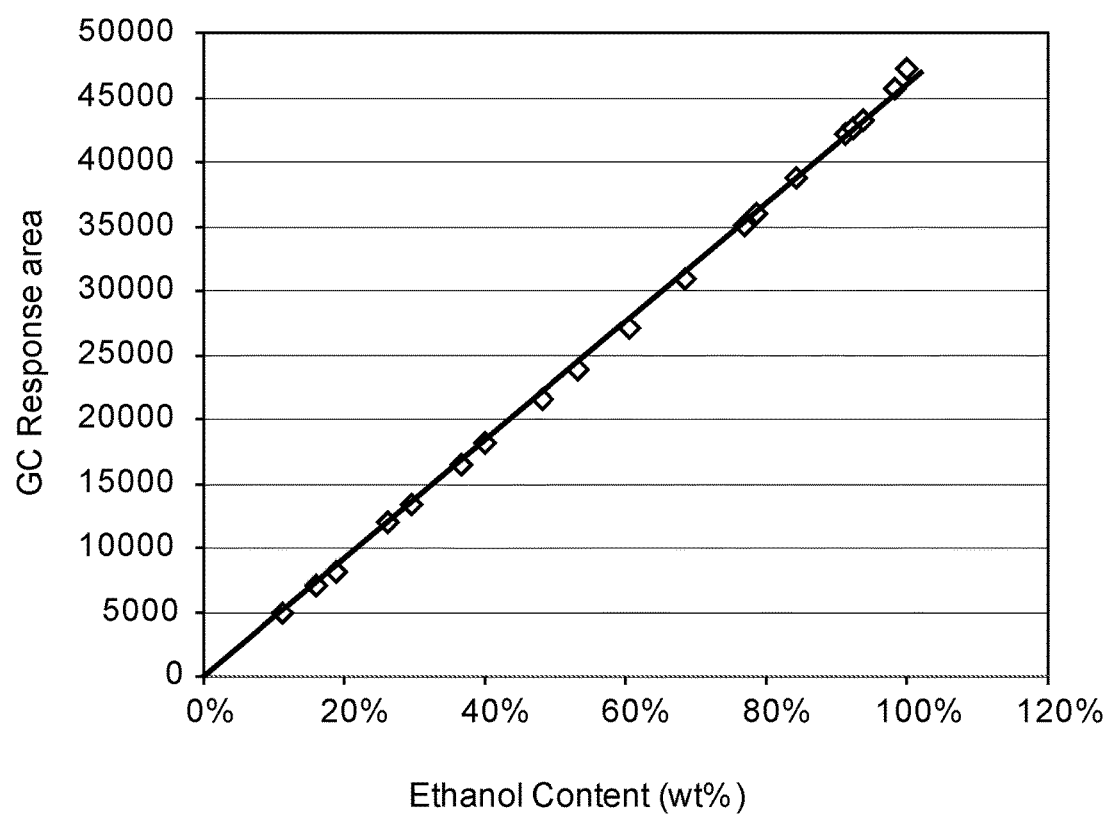
FIG. 5 is a graph of the GC response area vs ethanol concentration (y=45948x; $R^2$=0.9988).

The ability of the membranes to separate ethanol and gasoline from an ethanol/gasoline mixture was determined using the test apparatus depicted in FIG. 4 and the following technique. The membrane sample was mounted onto a stainless steel cell (Sepa CF II, obtained from General Electric Co., Fairfield, Conn.). The effective membrane surface area was 140 $cm^2$. A feedstock of E10 gasoline (10% ethanol) was heated by a heat exchanger and pumped through the membrane cell at a flow rate of 300-500 mL/min. The input and output temperatures of the feedstock at the inlet and outlet of the membrane cell was measured with thermometers. The permeate was collected in a cold trap cooled with liquid nitrogen. The membrane cell vacuum was controlled by a regulator connected to a vacuum pump. Testing was performed at three conditions: 70° C. feedstock temperature and 200 Torr (26.7 kPa) vacuum, 50° C. feedstock temperature and 85 Torr (11.3 kPa) vacuum, and 21-22° C. at 20 Torr (2.67 kPa) vacuum. The total permeate mass flux was calculated as:

$$\text{Flux} = m/(A \times t)$$

where m is the mass of the permeate in kilograms (kg); A is the effective membrane area in square meters ($m^2$); and t is the permeate collection duration time in hours (h). The ethanol content of the permeate and the feedstock were measured by gas chromatography (GC) using a Hewlett Packard Model 5890A or 7890C gas chromatograph. The alcohol content was determined by using a calibration line shown in FIG. 5, obtained by running known concentrations of ethanol through the GC and measuring the GC response area. Then the response area measurements of the permeate and feedstock from the GC were obtained, and then using the calibration line, the % ethanol was determined. Ethanol mass flux was calculated as membrane mass flux multiplied by the ethanol concentration in the permeate.

Method 2

The ability of the membranes to separate ethanol from an ethanol/gasoline mixture was determined as in Method 1 above except the test apparatus was run in a continuous mode after charging the initial test vessel with 1.1 liters of gasoline. Testing was conducted until the gasoline feed stream at the inlet of the membrane cell was less than 2.0 wt-%. The flow rate of the feed stream was maintained at 500 mL/min. Vacuum in the membrane permeate side was set at 200 Torr (26.7 kPa) and the average gasoline temperature at the inlet and outlet of the membrane cell was maintained at 70° C. Permeate samples were collected every 5-10 minutes. The average total mass flux was calculated based on the ethanol obtained from all the permeate samples collected over the total testing time.

EXAMPLES

Example 1

Figure 6:
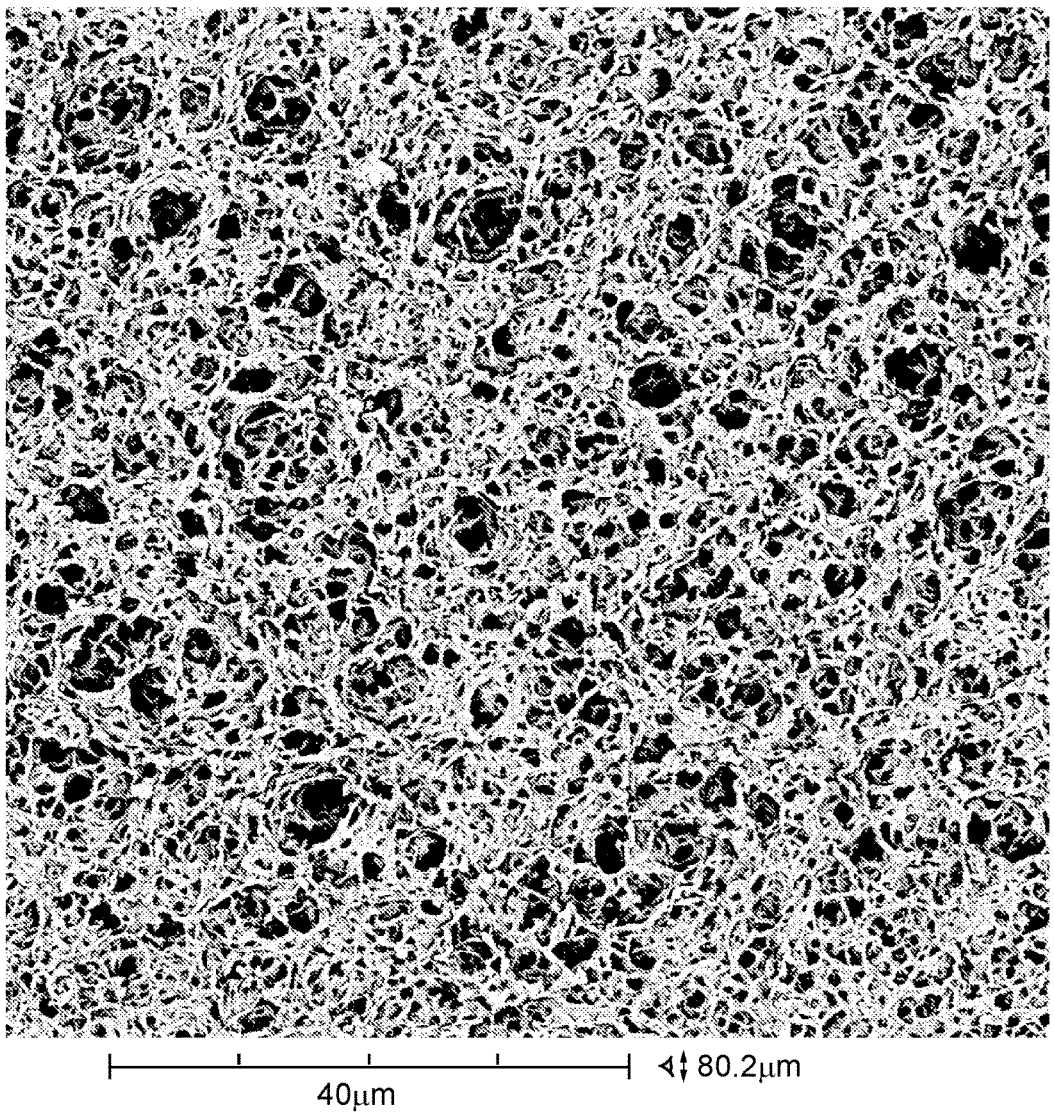
FIG. 6 is an SEM photograph (3000x) of the small pore side of the porous substrate used to make the composite membrane in Example 1.
Figure 7:
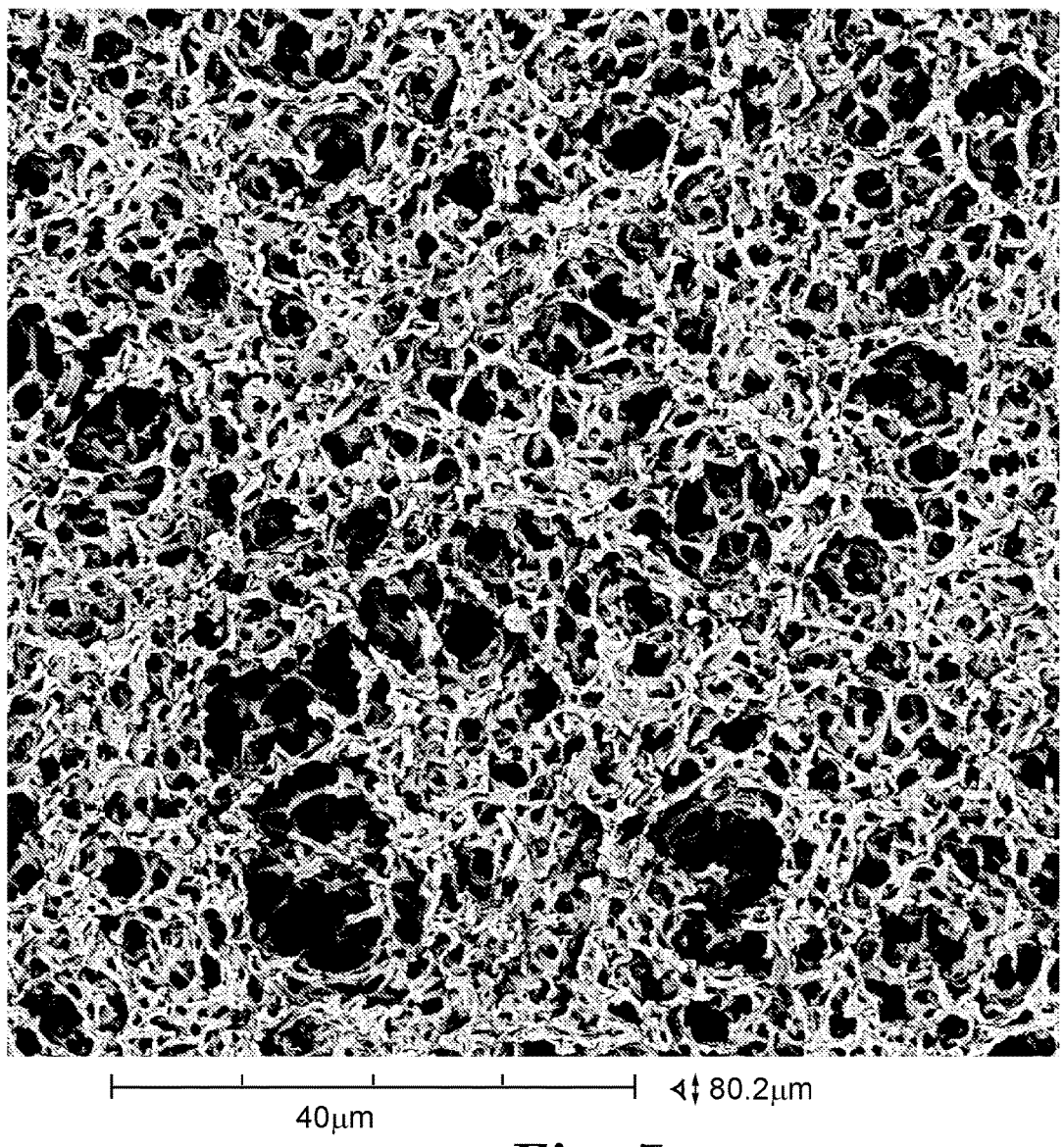
FIG. 7 is an SEM photograph (3000x) of the large pore side of the porous substrate used to make the composite membrane in Example 1.

An asymmetric pore filled membrane was prepared using a microporous nylon substrate (BLA020, obtained from 3M Purification Inc., Meriden, Conn.). This porous substrate is described as having a tight/small surface on one side with an average pore size of 0.2 micron and an open/large surface on an opposite side with an average pore size of 0.65 micron. FIG. 6 is an SEM photomicrograph of the small pore surface of the membrane. FIG. 7 is an SEM photomicrograph of the large pore surface of the membrane.

Figure 8:
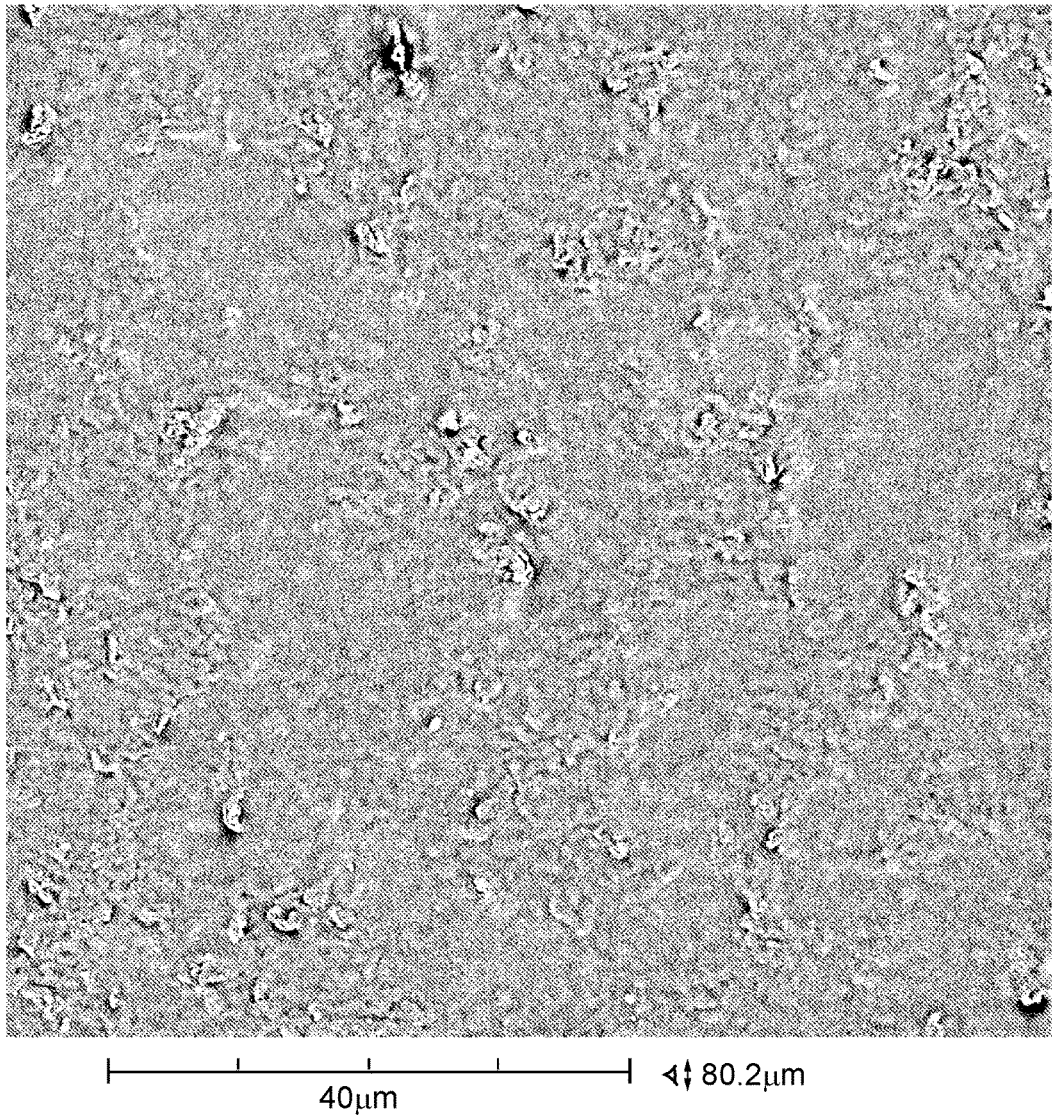
FIG. 8 is an SEM photograph (3000x) of the irradiated pore-filled side of the composite membrane according to Example 1.
Figure 9:
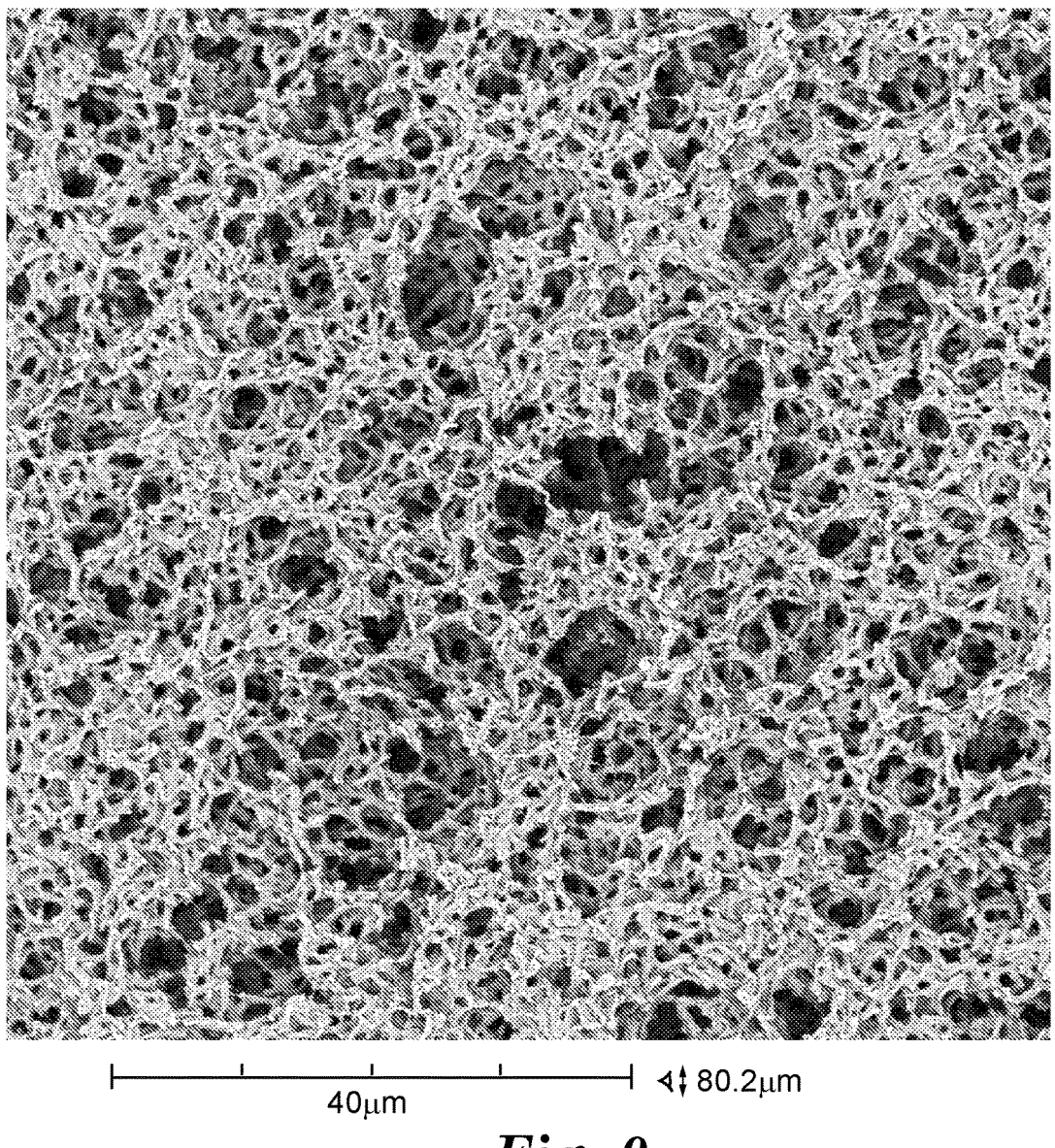
FIG. 9 is an SEM photograph (3000x) of the non-irradiated side of the composite membrane according to Example 1.

A pore-filling polymer solution was prepared by mixing 20.0 wt % of polyethylene glycol 400 diacrylate (SR344, obtained from Sartomer, Exton, Pa.) into 80.0 wt % deionized water. A BLA020 porous substrate (15 cm×25 cm) was placed into a polyethylene bag containing the pore-filling polymer solution to completely saturate and impregnate the porous substrate. The pore-filled substrate was removed from the bag and taped onto an aluminum panel (32 mm thick×38 cm width×51 cm length) with the tight/small pore side facing upwards. The panel was fed into an ultraviolet (UV) chamber on a moving belt running at a line speed of 6.1 meters/minute (m/min). The chamber was run with an inert nitrogen atmosphere and was equipped with a Fusion H lamp with an aluminum reflector as the UV source to polymerize and cross-link the SR344 acrylate. The UV cured pore-filled substrate was removed from the plate and washed with deionized water to remove any uncured polymer solution and then dried at room temperature. FIG. 8 is an SEM photomicrograph of the irradiated pore-filled small pore surface of the resulting composite membrane. FIG. 9 is an SEM photomicrograph of the non-irradiated large pore surface of the composite membrane.

The composite membrane was tested using Method 1 above except the gasoline feed temperature was maintained at approximately 27-31° C. at 20 Torr vacuum and the results are reported in Table 1 below.

Example 2

An asymmetric pore filled membrane was prepared as in Example 1 above. The resulting composite membrane was tested using Method 1 above except the gasoline feed temperature was maintained at approximately 21-22° C. at 20 Torr (2.67 kPa) vacuum and the results are reported in Table 1 below.

Example 3

An asymmetric pore filled membrane was prepared as in Example 2 above except the pore-filling polymer solution was prepared by mixing 30.0 wt % of polyethylene glycol 400 diacrylate (SR344), 2.0 wt % titanium (IV) oxide (APS powder 32 nanometer particle size, obtained from Alfa Aesar, MA) into 68.0 wt % deionized water with an ultrasonic bath for 30 minutes. The line speed into the UV chamber was set at 3.05 meters/minute (m/min). The resulting composite membrane was tested using Method 1 above except the gasoline feed temperature was maintained at approximately 21-22° C. at 20 Torr (2.67 kPa) vacuum and the results are reported in Table 1 below.

Example 4

An asymmetric pore filled membrane was prepared as in Example 1 above except the pore-filling polymer solution was prepared by mixing 30 wt % of polyethylene glycol 400 diacrylate (SR344) with Nalco 2326 (ammonia stabilized colloidal silica, 14.5% colloidal silica as $SiO_2$; particle size 5 nm; obtained from Nalco Chemical Company, Naperville, Ill.) in deionized water. The solution contained 30.0 wt % SR344, 5.0 wt % silica nanoparticles and 65.0 wt % deionized water.

The line speed into the UV chamber was set at 12.2 m/min. The resulting composite membrane was tested using Method 1 above except the gasoline feed temperature was maintained at approximately 21-22° C. at 20 Torr (2.67 kPa) vacuum and the results are reported in Table 1 below.

Example 5

An asymmetric pore filled membrane was prepared as in Example 1 above except the pore-filling polymer solution was prepared by mixing 30.0 wt % of polyethylene glycol 400 diacrylate (SR344) with Nalco 2326 (ammonia stabilized colloidal silica, 14.5% colloidal silica as $SiO_2$; particle size 5 nm; obtained from Nalco Chemical Company, Naperville, Ill.) in deionized water. The solution contained 30.0 wt % SR344, 10.0 wt % silica nanoparticles and 60 wt % deionized water.

The line speed into the UV chamber was set at 12.2 m/min. The resulting composite membrane was tested using Method 1 above except the gasoline feed temperature was maintained at approximately 21-22° C. at 20 Torr (2.67 kPa) vacuum and the results are reported in Table 1 below.

Example 6A

Figure 10:
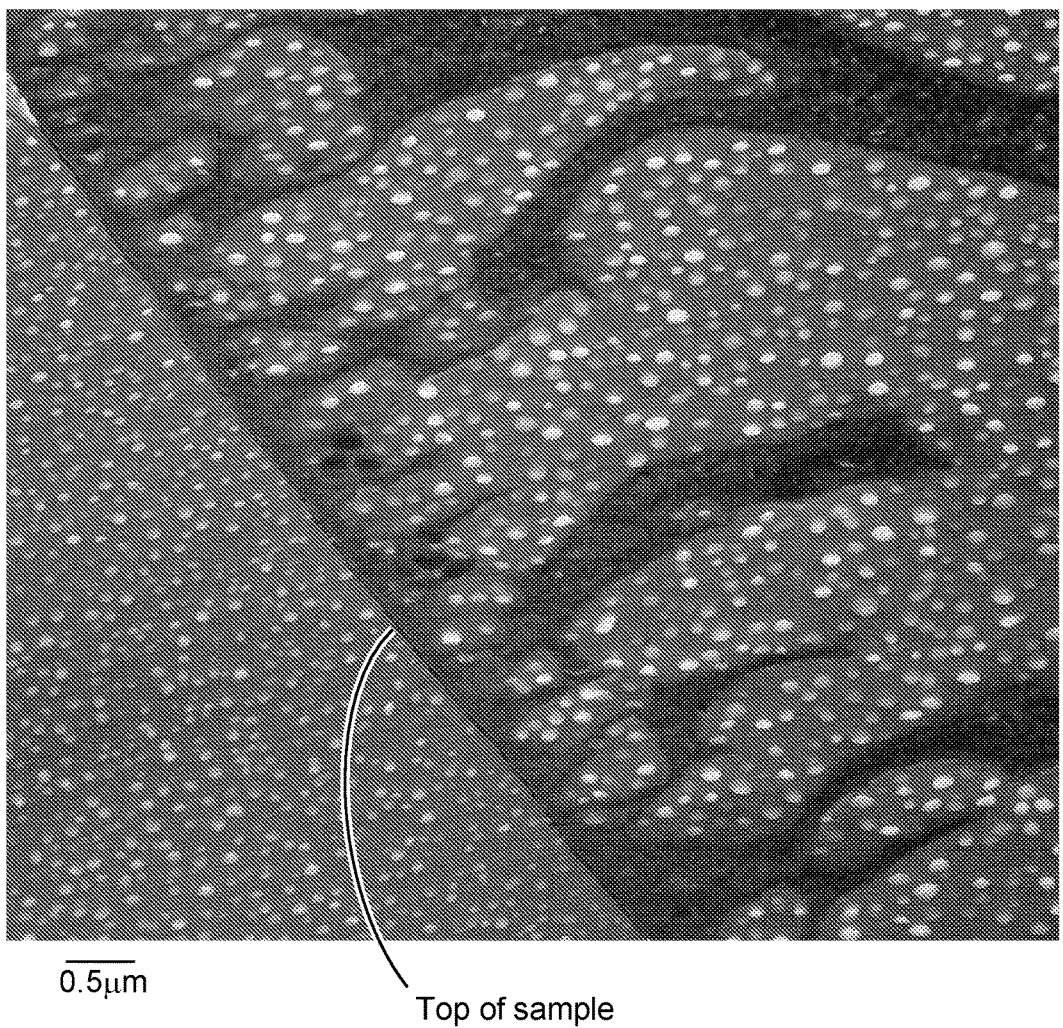
FIG. 10 is a TEM image of a cross-section of the porous substrate according to Example 6.
Figure 11:
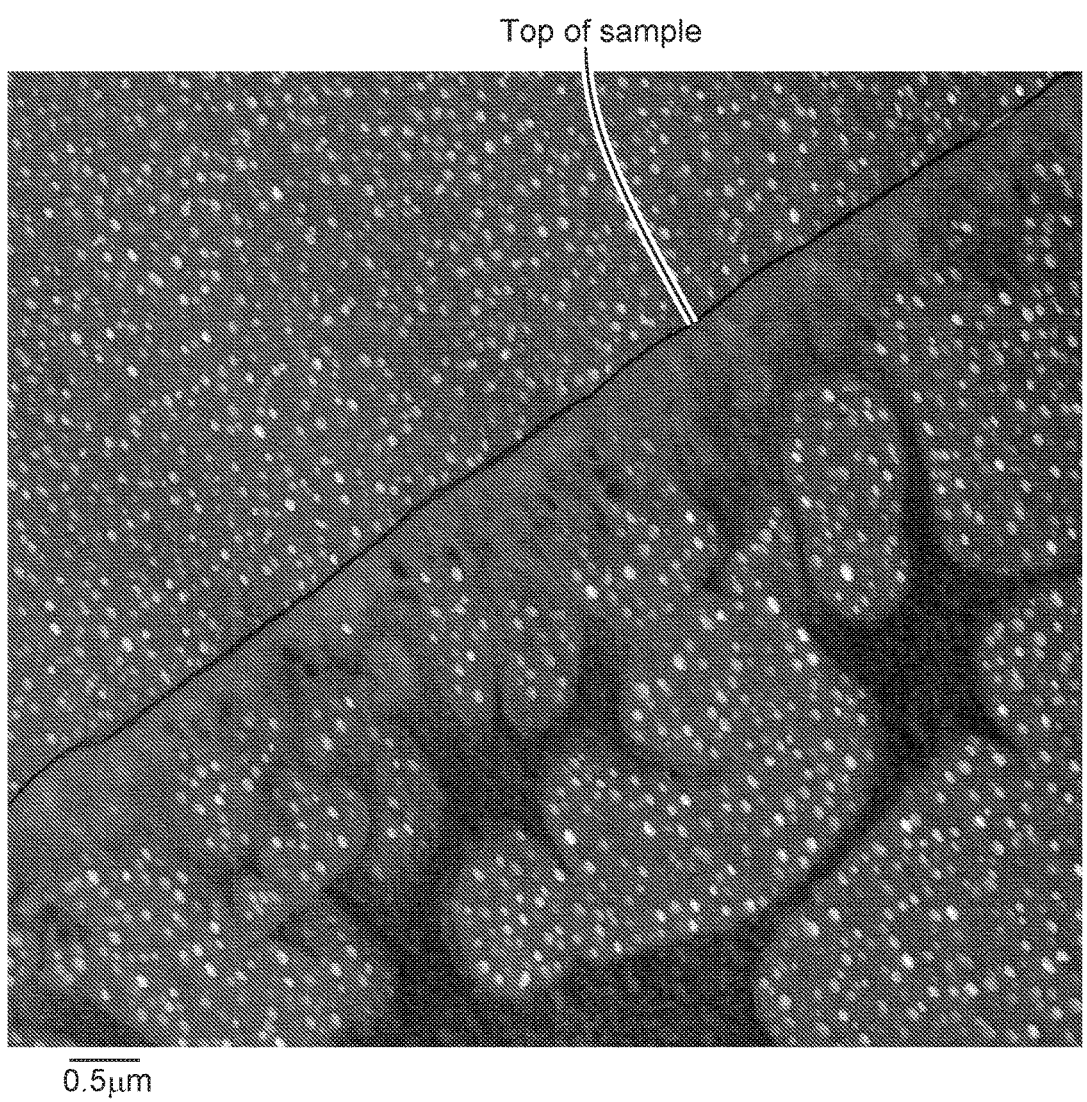
FIG. 11 is a TEM image of a cross-section of the asymmetric composite membrane according to Example 6.

An asymmetric pore filled membrane was prepared as in Example 1 above except a polyethersulfone nanoporous substrate (PE900C/D) was used as the substrate. The pore-filling polymer solution was prepared by mixing 40 wt % of SR344 into 60 wt % deionized water. The line speed was set at 12.2 m/min. The resulting composite membrane was tested using Method 1 above except the gasoline feed temperature was maintained at approximately 21-22° C. at 20 Torr (2.67 kPa) vacuum and a feedstock flow rate of 300 mL/min. The results are reported in Table 1 below. FIGS. 10 and 11 are transmission electrophotomicrographs (TEM) of the cross-section of the nanoporous substrate (FIG. 10) and the resulting composite membrane (FIG. 11).

Example 6B

An asymmetric pore filled membrane was prepared as in Example 6A above except the gasoline feed temperature was maintained at approximately 53° C. at 20 Torr (2.67 kPa) vacuum. The results are reported in Table 1 below.

Example 7A

An asymmetric pore filled membrane was prepared as in Example 6A above except the line speed was set at 6.1 m/min. The results are reported in Table 1 below.

Example 7B

An asymmetric pore filled membrane was prepared as in Example 6B above except the line speed was set at 6.1 m/min. The results are reported in Table 1 below.

Example 8A

An asymmetric pore filled membrane was prepared as in Example 6A above except a polyacrylonitrile nanoporous substrate (PA450) was used as the substrate. The results are reported in Table 1 below.

Example 8B

An asymmetric pore filled membrane was prepared as in Example 8A above except the gasoline feed temperature was maintained at approximately 53° C. at 20 Torr (2.67 kPa) vacuum. The results are reported in Table 1 below.

Example 9

An asymmetric pore filled membrane was prepared as in Example 1 above except a polyethersulfone nanoporous substrate (PE2) was used as a substrate. The pore-filling solution was prepared by mixing 22.0 wt-% of polyethylene glycol 600 diacrylate (SR610, obtained from Sartomer, Exton, Pa.) in a 10.0 wt-% sodium chloride (NaCl) deionized water solution. A dichroic reflector was used in place of the aluminum reflector. The line speed was set at 6.1 m/min. The resulting composite membrane was tested using Method 1 (70° C.) above. The results are reported in Table 1 below.

Example 10

An asymmetric pore filled membrane was prepared as in Example 9 above except the UV irradiation was carried out in a standard air atmosphere. There was approximately 20% oxygen in the atmosphere. The resulting composite membrane was tested using Method 1 (70° C.) above. The results are reported in Table 1 below.

Example 11

An asymmetric pore filled membrane was prepared using a polyethersulfone nanoporous substrate (PE5) was used as a substrate. A silicone diacrylate (EBECRYL 350 ("EB350")) obtained from Cytec Industries, Smyrna, Ga.) was used as the pore-filling polymer. An excess amount of the EB350 was applied to the surface of the substrate and spread evenly using a rod. A 3 minute diffusion time was allowed before blotting the excessive surface solution using a paper towel. UV irradiation of the pore-filled substrate was performed as in Example 1 except a dichroic reflector was used. The line speed was set at 6.1 m/min. The UV cured pore-filled substrate was washed in ethanol to remove any uncured polymer solution and then dried and tested using Method 1 above except the gasoline feed temperature was maintained at approximately 50° C. The results are reported in Table 1 below.

Example 12

An asymmetric pore filled membrane was prepared as in Example 11 above except the pore-filling solution was prepared by mixing 10.0 wt % of a triacrylate (SR454, ethoxylated 3-trimethylolpropane triacrylate, obtained from Sartomer, Exton, Pa.) with 90.0 wt % of EB350. The UV cured pore-filled substrate was washed in ethanol to remove any uncured polymer solution and then dried and tested using Method 1 (50° C.) above with the results reported in Table 1 below. The resulting composite membrane was also tested using Method 2 above with the results reported in Table 2 below.

Example 13

An asymmetric pore filled membrane was prepared as in Example 11 above except the pore-filling solution was prepared by mixing 20.0 wt % of trimethylolpropane triacrylate (TMPTA, obtained from Alfa Aesar, Ward Hill, Mass.) with 80.0 wt % of EB350. The UV cured pore-filled substrate was washed in ethanol to remove any uncured polymer solution and then dried and tested using Method 1 (50° C.) above with the results reported in Table 1 below. The resulting composite membrane was also tested using Method 2 above with the results reported in Table 2 below.

Example 14

An asymmetric pore filled membrane was prepared as in Example 11 above except the pore-filling solution was prepared by mixing 20.0 wt % of polyethylene glycol 200 diacrylate (SR259, obtained from Sartomer, Exton, Pa.) with 80.0 wt % of EB350. The UV cured pore-filled substrate was washed in ethanol to remove any uncured polymer solution and then dried and tested using Method 1 (50° C.) above with the results reported in Table 1 below.

Example 15

An asymmetric pore filled membrane was prepared as in Example 11 above except the pore-filling solution was prepared by mixing 20.0 wt % of SR344 with 80.0 wt % of EB350. The UV cured pore-filled substrate was washed in ethanol to remove any uncured polymer solution and then dried and tested using Method 1 (50° C.) above with the results reported in Table 1 below.

Example 16

An asymmetric pore filled membrane was prepared as in Example 11 above except the pore-filling solution was prepared by mixing 20.0 wt % of SR610 with 80.0 wt % of EB350. The UV cured pore-filled substrate was washed in ethanol to remove any uncured polymer solution and then dried and tested using Method 1 (50° C.) above with the results reported in Table 1 below.

Example 17

An asymmetric pore filled membrane was prepared as in Example 11 above except the pore-filling solution was prepared by mixing 30.0 wt % of glycerol triacetate (GTA, obtained from Univar USA, Redmond, Wash.) with 70.0 wt % of a blend of TMPTA (20.0%) and EB350 (80.0%). The UV cured pore-filled substrate was washed in ethanol to remove any uncured polymer solution and then dried and tested using Method 1 (50° C.) above with the results reported in Table 1 below.

Example 18

An asymmetric pore filled membrane was prepared as in Example 11 above except the pore-filling solution was prepared by mixing 30.0 wt % of GTA with 70.0 wt % of a blend of SR259 (20.0%) and EB350 (80.0%). The UV cured pore-filled substrate was washed in ethanol to remove any uncured polymer solution and then dried and tested using Method 1 (50° C.) above with the results reported in Table 1 below.

Example 19

An asymmetric pore filled membrane was prepared as in Example 11 above except the pore-filling solution was prepared by mixing 50.0 wt-% of GTA with 50.0 wt % of a blend of SR259 (20%) and EBACRYL E350 (80%). The UV cured pore-filled substrate was washed in ethanol to remove any uncured polymer solution and then dried and tested using Method 1 (50° C.) above with the results reported in Table 1 below.

Example 20

An asymmetric pore filled membrane was prepared as in Example 11 above except the pore-filling solution was prepared by mixing 50.0 wt % of dibutyl sebacate (DBS obtained from Vertellus Performance Materials, Inc., Greensboro, N.C.) with 50.0 wt % of EB350. The UV cured pore-filled substrate was washed in ethanol to remove any uncured polymer solution and then dried and tested using Method 1 (50° C.) above with the results reported in Table 1 below.

Example 21

An asymmetric pore filled membrane was prepared as in Example 1 above except polyethersulfone nanoporous substrate (PE2) was used as the substrate. The pore-filling polymer solution was prepared by mixing 40.0 wt % of polyethylene glycol 400 dimethacrylate (SR603OP obtained from Sartomer, Exton, Pa.) with 60.0 wt % of deionized water. A dichroic reflector was used in place of the aluminum reflector. The line speed was set at 12.2 m/min. The UV cured pore-filled substrate was washed in deionized water to remove any uncured polymer solution and then dried and tested using Method 1 (70° C.) above with the results reported in Table 1 below.

Example 22

An asymmetric pore filled membrane was prepared as in Example 21 above except the pore-filling solution was prepared by mixing 40.0 wt % of SR603OP with 60.0 wt % of DBS. The line speed was set at 12.2 m/min. The UV cured pore-filled substrate e was washed in ethanol to remove any uncured polymer solution and then dried and tested using Method 1 (70° C.) above with the results reported in Table 1 below.

Example 23

An asymmetric pore filled membrane was prepared as in Example 22 above except the pore-filling solution was prepared by mixing 40.0 wt % of methoxy polyethylene glycol 550 monoacrylate (CD553, obtained from Sartomer, Exton, Pa.) with 60.0 wt % of DBS. The line speed was set at 12.2 m/min. An aluminum reflector was used in the UV chamber. The UV cured pore-filled substrate was washed in ethanol to remove any uncured polymer solution and then dried and tested using Method 1 (70° C.) above with the results reported in Table 1 below. FIG. 12 is an SEM photomicrograph of the cross-section of the irradiated pore-filled resulting composite membrane. The thickness of the top, irradiated/cured layer was measured to be approximately 200 nanometers.

Example 24

An asymmetric pore filled membrane was prepared as in Example 23 above except the pore-filling solution was prepared by mixing 40.0 wt % of methoxy polyethylene glycol 550 monoacrylate (CD552, obtained from Sartomer, Exton, Pa.) with 60.0 wt-% of DBS. The UV cured pore-filled substrate was washed in ethanol to remove any uncured polymer solution and then dried and tested using Method 1 (70° C.) above with the results reported in Table 1 below.

Example 25

An asymmetric pore filled membrane was prepared as in Example 21 above except a polyethersulfone nanoporous substrate (PE5) was used as the substrate. The pore-filling solution was prepared by mixing 40.0 wt % of 2-hydroxyl methacrylate (HEMA, obtained from Alfa Aesar, Ward Hill, Mass.) with 60.0 wt-% of deionized water. The line speed was set at 6.1 m/min. A dichroic reflector was used. The UV cured pore-filled substrate was washed in ethanol to remove any uncured polymer solution and then dried and tested using Method 1 (50° C.) above with the results reported in Table 1 below.

Example 26

An asymmetric pore filled membrane was prepared as in Example 25 above except the pore-filling solution was prepared by mixing 20.0 wt % of SR344 with 80.0 wt % of deionized water. A polyethersulfone nanoporous substrate (PE5) was used as the substrate. The UV cured pore-filled substrate was washed in ethanol to remove any uncured polymer solution and then dried and tested using Method 1 (50° C.) above with the results reported in Table 1 below.

Example 27

An asymmetric pore filled membrane was prepared as in Example 26 above except the pore-filling solution was prepared by mixing 20.0 wt % of SR344 with 79.9 wt % of deionized water. 0.1 wt-% a photoinitiator (1-[4-(2-Hydroxyethoxy)-phenyl]-2-hydroxy-2-methyl-1-propane-1-one, IRGACURE® 2959, obtained from BASF Corp., Florham Park, N.J.) was added to the polymer solution. The UV cured pore-filled substrate was washed in ethanol to remove any uncured polymer solution and then dried and tested using Method 1 (50° C.) above with the results reported in Table 1 below.

Example 28

An asymmetric pore filled membrane was prepared as in Example 11 above except the pore-filling solution was prepared by mixing 10.0 wt % of SR454 with 90.0 wt-% of GTA. A 3 minute diffusion time was allowed before blotting the excessive surface solution using a paper towel. UV irradiation of the pore-filled substrate was performed as in Example 11. The UV cured pore-filled substrate was washed in ethanol to remove any uncured polymer solution and then dried and tested using Method 1 (50° C.) above with the results reported in Table 1 below.

Example 29

An asymmetric pore filled membrane was prepared as in Example 28 above except the pore-filling solution was prepared by mixing 10.0 wt % of 1H,1H,6H,6H-perflourohexyldiacrylate (FHDA, obtained from Oakwood Products, West Columbia, S.C.) with 90.0 wt % of GTA. A one minute diffusion time was allowed before blotting the excessive surface solution using a paper towel before UV irradiation. The line speed was set at 6.1 m/min. A dichroic reflector was used. The UV cured pore-filled substrate was washed in ethanol to remove any uncured polymer solution and then dried and tested using Method 1 (50° C.) above with the results reported in Table 1 below.

Example 30

An asymmetric pore filled membrane was prepared as in Example 29 above except the pore-filling solution was prepared by mixing 50.0 wt-% of FHDA with 50.0 wt-% of GTA. The UV cured pore-filled substrate was washed in ethanol to remove any uncured polymer solution and then dried and tested using Method 1 (50° C.) above with the results reported in Table 1 below.

Example 31

An asymmetric pore filled membrane was prepared as in Example 29 above except the pore-filling solution was prepared by mixing 80.0 wt % of polypropylene glycol 900 diacrylate (PPG900DA, obtained from Sigma Aldrich, Milwaukee, Wis.) with 20.0 wt % of GTA. The UV cured pore-filled substrate was washed in ethanol to remove any uncured polymer solution and then dried and tested using Method 1 (50° C.) above with the results reported in Table 1 below.

Example 32

An asymmetric pore filled membrane was prepared as in Example 31 above except the pore-filling solution was prepared by mixing 80.0 wt % PPG900DA with 20.0 wt % of SR344. The UV cured pore-filled substrate was washed in ethanol to remove any uncured polymer solution and then dried and tested using Method 1 (50° C.) above with the results reported in Table 1 below.

Example 33

An asymmetric pore filled membrane was prepared as in Example 25 above except the pore-filling solution was prepared by mixing 20.0 wt % SR610 with 80.0 wt % of deionized water. The UV cured pore-filled substrate was washed in deionized water to remove any uncured polymer solution and then dried and tested using Method 1 (50° C.) above with the results reported in Table 1 below.

Example 34

An asymmetric pore filled membrane was prepared as in Example 33 above except the pore-filling solution was prepared by mixing 20.0 wt % SR610 with 78.0 wt % of deionized water and 2.0 wt % sodium chloride (NaCl). The UV cured pore-filled substrate was washed in deionized water to remove any uncured polymer solution and then dried and tested using Method 1 (50° C.) above with the results reported in Table 1 below.

Example 35

An asymmetric pore filled membrane was prepared as in Example 34 above except the pore-filling solution was prepared by mixing 20.0 wt % SR610 with 77.8 wt % of deionized water and 2.0 wt % sodium chloride (NaCl) and 0.2 wt % N,N'-methylenebisacrylamide (BIS, obtained from Alfa Aesar, Ward Hill, Mass.). The UV cured pore-filled substrate was washed in deionized water to remove any uncured polymer solution and then dried and tested using Method 1 (50° C.) above with the results reported in Table 1 below.

Example 36

An asymmetric pore filled membrane was prepared as in Example 34 above except the pore-filling solution was prepared by mixing 15.0 wt % SR610 with 78.4 wt % of deionized water and 6.0% NaCl and 0.6 wt % BIS. The UV cured pore-filled substrate was washed in deionized water to remove any uncured polymer solution and then dried and tested using Method 1 (50° C.) above with the results reported in Table 1 below. The resulting composite membrane was also tested using Method 2 (70° C.) above with the results reported in Table 2 below.

Example 37

An asymmetric pore filled membrane was prepared as in Example 34 above except the pore-filling solution was prepared by mixing 15.0 wt % SR415 (ethoxylated trimethylolpropane triacrylate, obtained from Sartomer, Exton, Pa.) with 78.4 wt-% of deionized water and 6% NaCl and 0.6 wt % BIS. The UV cured pore-filled substrate was washed in deionized water to remove any uncured polymer solution and then dried and tested using Method 1 (50° C.) above with the results reported in Table 1 below.

Example 38

An asymmetric pore filled membrane was prepared as in Example 34 above except the pore-filling solution was prepared by mixing 10.0 wt % polyethylene glycol methylether methacrylate (PEGMMA, Mn~2080, obtained from Sigma Aldrich, Milwaukee, Wis.) with 89.2 wt % of deionized water and 0.8 wt % BIS. The UV cured pore-filled substrate was washed in deionized water to remove any uncured polymer solution and then dried and tested using Method 1 (50° C.) above with the results reported in Table 1 below.

Example 39

An asymmetric pore filled membrane was prepared as in Example 33 above except the pore-filling solution was prepared by mixing 20.0 wt % polyester acrylate (CN2622, obtained from Sartomer Co., Exton, Pa.) with 80.0 wt % GTA. The UV cured pore-filled substrate was washed in ethanol to remove any uncured polymer solution and then dried and tested using Method 1 (70° C.) above with the results reported in Table 1 below.

Example 40

An asymmetric pore filled membrane was prepared as in Example 38 above except the pore-filling solution was prepared by mixing 20.0 wt % SR610 with 77.4 wt % deionized water and 2.5 wt % 2-acrylamido-2-methylpropanesulfonic acid (AMPS, obtained from Sigma Aldrich, Milwaukee, Wis.) and 0.1 wt % IRGACURE 2959. A polyethersulfone nanoporous substrate (PE2) was used as the substrate. The line speed was set at 12.2 m/min. The UV irradiation was performed in a standard air atmosphere. The UV cured pore-filled substrate was washed in deionized water to remove any uncured polymer solution and then dried and tested using Method 1 (70° C.) above with the results reported in Table 1 below.

Example 41

An asymmetric pore filled membrane was prepared as in Example 40 above except the pore-filling solution was prepared by mixing 20.0 wt % SR610 with 77.5 wt % deionized water and 2.5 wt % AMPS. The UV cured pore-filled substrate was washed in deionized water to remove any uncured polymer solution and then dried and tested using Method 1 (70° C.) above with the results reported in Table 1 below.

Example 42

An asymmetric pore filled membrane was prepared as in Example 40 above except the pore-filling solution was prepared by mixing 10 wt % SR610 with 84.5 wt % deionized water and 5.0 wt % AMPS and 0.1 wt % IRGACURE 2959. The line speed was 18.3 m/min. The UV cured pore-filled substrate was washed in ethanol to remove any uncured polymer solution and then dried and tested using Method 1 (70° C.) above with the results reported in Table 1 below.

Example 43

An asymmetric pore filled membrane was prepared as in Example 40 above except the pore-filling solution was prepared by mixing 20.0 wt % SR610 with 75.0 wt % deionized water and 5.0 wt % AMPS. The UV cured pore-filled substrate was washed in deionized water to remove any uncured polymer solution and then dried and tested using Method 1 (70° C.) above with the results reported in Table 1 below.

Example 44

An asymmetric pore filled membrane was prepared as in Example 40 above except the pore-filling solution was prepared by mixing 5.0 wt % SR344 with 90.0 wt % deionized water and 5.0 wt % AMPS. The line speed was 6.1 m/min. The UV cured pore-filled substrate was washed in deionized water to remove any uncured polymer solution and then dried and tested using Method 1 (70° C.) above with the results reported in Table 1 below.

Example 45

An asymmetric pore filled membrane was prepared using a polyethersulfone nanoporous substrate (PE5) was used a substrate. A pore-filling solution was prepared by mixing 60.0 wt % of SR415 (obtained from Sartomer, Exton, Pa.) and 40.0 wt % deionized water. An excess amount of the solution above was applied to the surface of the substrate and spread evenly using a Mayer rod #8. A 1 min diffusion time was allowed before blotting the excessive surface solution using a paper towel. UV irradiation of the pore-filled substrate was performed as in Example 1. The line speed was set at 12.2 m/min. The UV cured pore-filled substrate was washed in deionized water at 50° C. for at least 2 hours and then dried and tested using method 1 at 70° C. feedstock temperature. The results are reported in Table 1.

Example 46

An asymmetric pore filled membrane was prepared as in Example 45 above except the pore-filling solution was prepared by mixing 60.0 wt % SR415, 5.0 wt % polyacrylic acid (weight average molecular weight (MW) approximately 1800, obtained from Alfa Aesar, Ward Hill, Mass.) and 35.0 wt % deionized water. The UV cured pore-filled substrate was washed in deionized water at 50° C. for at least 2 hours and then dried and tested using method 1 at 70° C. feedstock temperature with the results reported in Table 1. In the presence of polyacrylic acid, both permeate ethanol concentration and ethanol mass flux increased.

Example 47

An asymmetric pore filled membrane was prepared as in Example 45 above except the pore-filling solution was prepared by mixing 60.0 wt % SR610, and 40.0 wt % deionized water. The UV cured pore-filled substrate was washed in deionized water at 50° C. for at least 2 hours and then dried and tested using method 1 at 70° C. feedstock temperature with the results reported in Table 1.

Example 48

An asymmetric pore filled membrane was prepared as in Example 45 above except the pore-filling solution was prepared by mixing 60.0 wt % SR610, 5.0 wt % polyacrylic acid (weight average MW approximately 1800) and 35.0 wt % deionized water. The UV cured pore-filled substrate was washed in deionized water at 50° C. for at least 2 hours and then dried and tested using method 1 at 70° C. feedstock temperature with the results reported in Table 1. In the presence of polyacrylic acid, again both permeate ethanol concentration and ethanol mass flux increased.

Example 49

An asymmetric pore filled membrane was prepared as in Example 45 above except the pore-filling solution was prepared by mixing 60.0 wt % SR610, 5.0 wt % polyacrylic acid (weight average MW approximately 5000, obtained from Alfa Aesar, Ward Hill, Mass.) and 35.0 wt % deionized water. The UV cured pore-filled substrate was washed in deionized water at 50° C. for at least 2 hours and then dried and tested using method 1 at 70° C. feedstock temperature with the results reported in Table 1.

TABLE 1

| Example # | Total Mass Flux (kg/m²/h) | Feed ethanol concentration | Permeate ethanol concentration | Ethanol Mass Flux (kg/m²/h) |
|---|---|---|---|---|
| 1 | 5.49 | 9.3% | 34.1% | 1.87 |
| 2 | 1.85 | 8.0% | 39.3% | 0.73 |
| 3 | 0.55 | 8.9% | 50.3% | 0.28 |
| 4 | 1.45 | 9.5% | 43.5% | 0.63 |
| 5 | 1.15 | 10.7% | 49.5% | 0.57 |
| 6A | 1.39 | 8.6% | 59.6% | 0.83 |
| 6B | 5.59 | 9.3% | 66.6% | 3.72 |
| 7A | 0.73 | 11.2% | 75.5% | 0.55 |
| 7B | 3.08 | 9.2% | 78.4% | 2.41 |
| 8A | 2.03 | 9.0% | 54.9% | 1.11 |
| 8B | 6.43 | 9.7% | 49.9% | 3.21 |
| 9 | 9.10 | 9.0% | 57.7% | 5.25 |
| 10 | 5.84 | 7.2% | 68.3% | 3.99 |
| 11 | 6.64 | 7.6% | 42.1% | 2.80 |
| 12 | 4.47 | 7.7% | 57.0% | 2.55 |
| 13 | 2.78 | 8.8% | 65.1% | 1.81 |
| 14 | 0.65 | 9.4% | 95.2% | 0.62 |
| 15 | 0.51 | 7.4% | 84.4% | 0.43 |
| 16 | 0.89 | 9.5% | 94.6% | 0.84 |
| 17 | 3.60 | 9.9% | 60.0% | 2.16 |
| 18 | 0.86 | 8.7% | 89.5% | 0.77 |
| 19 | 2.63 | 9.1% | 63.6% | 1.67 |
| 20 | 5.38 | 10.6% | 62.6% | 3.37 |
| 21 | 6.79 | 7.7% | 52.6% | 3.57 |
| 22 | 8.10 | 7.4% | 62.9% | 5.09 |
| 23 | 11.14 | 7.5% | 39.6% | 4.41 |
| 24 | 6.28 | 7.8% | 50.0% | 3.14 |
| 25 | 1.90 | 8.5% | 39.8% | 0.76 |
| 26 | 7.24 | 9.1% | 58.4% | 4.23 |
| 27 | 5.31 | 9.8% | 55.8% | 2.96 |
| 28 | 0.80 | 8.6% | 82.2% | 0.66 |
| 29 | 1.37 | 9.2% | 77.8% | 1.07 |
| 30 | 0.51 | 9.7% | 93.3% | 0.48 |
| 31 | 19.74 | 8.3% | 23.7% | 4.68 |
| 32 | 1.32 | 8.4% | 82.5% | 1.09 |
| 33 | 5.36 | 7.8% | 63.1% | 3.38 |
| 34 | 7.42 | 9.1% | 61.0% | 4.53 |
| 35 | 5.75 | 9.3% | 64.6% | 3.71 |
| 36 | 4.48 | 9.5% | 70.0% | 3.14 |
| 37 | 3.80 | 9.7% | 71.6% | 2.72 |
| 38 | 0.92 | 8.8% | 74.5% | 0.69 |
| 39 | 4.10 | 7.3% | 63.9% | 2.62 |
| 40 | 11.93 | 9.3% | 51.4% | 6.13 |
| 41 | 6.13 | 8.7% | 65.4% | 4.01 |
| 42 | 3.50 | 8.1% | 74.6% | 2.61 |
| 43 | 5.43 | 8.5% | 71.2% | 3.87 |
| 44 | 1.88 | 8.1% | 78.6% | 1.48 |
| 45 | 4.40 | 9.2% | 55.9% | 2.48 |
| 46 | 4.60 | 9.0% | 59.1% | 2.70 |
| 47 | 3.90 | 8.9% | 62.6% | 2.41 |
| 48 | 4.29 | 8.9% | 69.7% | 2.99 |
| 49 | 4.70 | 9.2% | 68.0% | 3.20 |

TABLE 2

| Example # | Total Mass Flux (kg/m²/h) | Permeate ethanol concentration | Average ethanol mass flux (kg/m²/h) |
|---|---|---|---|
| 12 | 6.79 | 45.2% | 3.07 |
| 13 | 3.36 | 57.2% | 1.93 |
| 36 | 4.46 | 59.6% | 2.66 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An asymmetric composite membrane for selectively pervaporating alcohol from an alcohol and gasoline feed mixture, the asymmetric composite membrane comprising:
    a porous substrate comprising opposite first and second major surfaces, and a plurality of pores; and
    a pore-filling polymer disposed in at least some of the pores so as to form a layer having a thickness within the porous substrate, with the amount of the pore-filling polymer at, or adjacent to, the first major surface being greater than the amount of the pore-filling polymer at, or adjacent to, the second major surface;
    wherein the pore-filling polymer is more permeable to alcohol than gasoline;
    wherein the asymmetric composite membrane further comprises
        a liquid ionic compound selected from 1-ethyl-3-methyl imidazolium tetrafluoroborate (Emim-BF$_4$), 1-ethyl-3-methyl imidazolium trifluoromethane sulfonate (Emim-TFSA), 3-methyl-N-butyl-pyridinium tetrafluoroborate, 3-methyl-N-butyl-pyridinium trifluoromethanesulfonate, N-butyl-pyridinium tetrafluoroborate, 1-butyl-2,3-dimethylimidazolium tetrafluoroborate, 1-butyl-2,3-dimethylimidazolium trifluoromethanesulfonate, 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium iodide, 1-butyl-3-methylimidazolium nitrate, 1-ethyl-3-methylimidazolium bromide, 1-ethyl-3-methylimidazolium iodide, 1-ethyl-3-methylimidazolium nitrate, 1-butylpyridinium bromide 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium acetate, 1-butyl-3-methylimidazolium trifluoroacetate, and 1-butyl-3-methyl imidazolium bis(trifluormethylsulfonyl)imide (Bmim-Tf$_2$N).

2. A cartridge for separating alcohol from an alcohol and gasoline mixture, the cartridge comprising the composite membrane of claims 1.

3. A fuel separation system comprising one or more cartridges according to claim 2.

4. The fuel separation system according to claim 3 wherein the one or more cartridges are in series or parallel.

5. A method of separating a first liquid from a mixture of the first liquid and a second liquid, the method comprising contacting the mixture with a composite membrane according to claim 1.

* * * * *

UNITED STATES PATENT AND TRADEMARK OFFICE
CERTIFICATE OF CORRECTION

PATENT NO. : 10,478,778 B2
APPLICATION NO. : 15/737945
DATED : November 19, 2019
INVENTOR(S) : Jinsheng Zhou Page 1 of 2

It is certified that error appears in the above-identified patent and that said Letters Patent is hereby corrected as shown below:

On the Title Page

Page 4, Column 1 (Other Publications), Line 12, delete "Polyacrylontrile" and insert -- Polyacrylonitrile --, therefor.

Page 5, Column 2 (Other Publications), Line 6, delete "Polymide" and insert -- Polyimide --, therefor.

In the Specification

Column 5
Line 9, delete "nanopororous" and insert -- nanoporous --, therefor.

Column 7
Line 37, delete "poly(l-butene)," and insert -- poly(1-butene), --, therefor.

Column 8
Line 56, after "μm" delete "up".

Column 9
Line 24, delete "(m)." and insert -- (μm). --, therefor.
Line 58, after "μm" delete "up".

Column 11
Line 67, delete "-methylpropanefulfonic" and insert -- -methylpropanesulfonic --, therefor.

Column 13
Line 9, delete "-(dimethlamino)-" and insert -- -(dimethylamino)- --, therefor.

Column 14
Lines 25-26, delete "(trifluormethylsulfonyl)" and insert -- (trifluoromethylsulfonyl) --, therefor.

Signed and Sealed this
Fourth Day of February, 2020

Andrei Iancu
*Director of the United States Patent and Trademark Office*

Column 15
Line 11 (approx.), delete "SiF4, SiF4," and insert -- SiF4, --, therefor.
Line 13 (approx.), delete "pentafluorotolenene." and insert -- pentafluorotoluene. --, therefor.

Column 16
Line 7 (approx.), delete "sebecate," and insert -- sebacate, --, therefor.

Column 19
Line 17 (approx.), after "L" insert -- . --.
Line 57, after "membrane" insert -- . --.

Column 20
Line 21, delete "fluoridd);" and insert -- fluoride); --, therefor.
Line 32, delete "SiF4, SiF4," and insert -- SiF4, --, therefor.
Line 35, delete "pentafluorotolenene." and insert -- pentafluorotoluene. --, therefor.
Line 54, delete "-trifluoromethyoxy-" and insert -- -trifluoromethyloxy- --, therefor.
Line 60, delete "ionid" and insert -- ionic --, therefor.

Column 21
Line 38, delete "(trifluormethylsulfonyl)" and insert -- (trifluoromethylsulfonyl) --, therefor.

Column 23
Line 33, delete "2-methylpropanefulfonic" and insert -- 2-methylpropanesulfonic --, therefor.

Column 24
Lines 49-50, delete "-perflourohexyldiacrylate," and insert -- -perfluorohexyldiacrylate, --, therefor.

Column 27
Line 67, delete "electrophotomicrographs" and insert -- electronphotomicrographs --, therefor.

Column 30
Line 32 (approx.), delete "EBACRYL" and insert -- EBECRYL --, therefor.

Column 32
Lines 27-28, delete "-perflourohexyldiacrylate" and insert -- -perfluorohexyldiacrylate --, therefor.

In the Claims

Column 38
Line 22 (approx.), In Claim 1, after "bromide" insert -- , --.
Lines 28-29 (approx.), In Claim 1, delete "(trifluormethylsulfonyl)" and insert -- (trifluoromethylsulfonyl) --, therefor.
Line 33 (approx.), In Claim 2, delete "claims" and insert -- claim --, therefor.